US009043192B2

(12) United States Patent
Lu

(10) Patent No.: US 9,043,192 B2
(45) Date of Patent: May 26, 2015

(54) MODELING GATE RESISTANCE OF A MULTI-FIN MULTI-GATE FIELD EFFECT TRANSISTOR

(75) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 13/462,849

(22) Filed: May 3, 2012

(65) Prior Publication Data

US 2013/0297277 A1    Nov. 7, 2013

(51) Int. Cl.
*G06F 17/50*    (2006.01)

(52) U.S. Cl.
CPC ........ *G06F 17/5022* (2013.01); *G06F 17/5036* (2013.01)

(58) Field of Classification Search
CPC ..... H01L 29/78; H01L 21/845; H01L 29/785; G06F 17/5036; G06F 17/5081; G06F 17/5068
USPC .......... 716/109, 106, 110, 115; 703/4, 14, 19; 702/117; 257/24, 365, 401
See application file for complete search history.

(56) References Cited

U.S. PATENT DOCUMENTS

| | | | |
|---|---|---|---|
| 6,110,219 A | 8/2000 | Jiang | |
| 6,802,047 B1 * | 10/2004 | Doniger | 716/109 |
| 7,299,428 B2 | 11/2007 | Ma et al. | |
| 2007/0128740 A1 | 6/2007 | Donze et al. | |
| 2009/0309162 A1 | 12/2009 | Baumgartner et al. | |

FOREIGN PATENT DOCUMENTS

| | | |
|---|---|---|
| JP | 2000-101097 | 4/2000 |
| JP | 2011-086831 | 4/2011 |

OTHER PUBLICATIONS

Wu et al., Gate Resistance Modeling of Multifin MOS Devices, IEEE Electron Device Letters, vol. 27, No. 1 Jan. 2006, pr. 68-70.*
Scholten, et al., FinFET Compact Modeling for Analogue and RF Applications, Electron Device Modeling 2010, IEEE International Digital Object Identifier: 10.1109/IEDM.2010.5703322, 2010, p. 8.4.1-8.4.4.*

(Continued)

*Primary Examiner* — Aniss Chad
*Assistant Examiner* — Scott S Cook
(74) *Attorney, Agent, or Firm* — Gibb & Riley, LLC; Anthony J. Canale

(57) ABSTRACT

The embodiments relate to modeling resistance in a multi-fin multi-gate field effect transistor (MUGFET). In these embodiments, a design for a multi-fin MUGFET comprises a gate structure with a horizontal portion traversing multiple semiconductor fins and comprising a plurality of first resistive elements connected in series, with vertical portions adjacent to opposing sides of the semiconductor fins and comprising second resistive elements connected in parallel by the horizontal portion, and with contact(s) comprising third resistive element(s). The total gate resistance is determined based on resistance contributions from the first resistive elements, the second resistive elements and the third resistive element(s), particularly, where each resistive contribution is based on a resistance value of the resistive element, a first fraction of current from the semiconductor fins entering the resistive element and a second fraction of the current from the semiconductor fins exiting the resistive element.

24 Claims, 12 Drawing Sheets

(56) References Cited

OTHER PUBLICATIONS

Green, w. Basic Laws of Electrical Circuits: Equivalent Resistance. Lesson 5, University of Tennessee, Aug. 27, 2003 http://web.eecs.utk.edu/~green/notes/Lesson%205%20Resistance,%20Equivalent.ppt.*

Vega, R., Advanced Source/Drain and Contact Design for Nanoscale CMOS, Electrical Engineering and Computer Sciences University of California at Berkely, Technical Report No. UCB/EECS-2010-84 May 20, 2010.*

Jin, et al., "An Effective Gate Resistance Model for CMOS RF and Noise Modeling," Electron Devices Meeting 1998, IEEE International Digital Object Identifier: 10.1109/IEDM.1998.746514, 1998, p. 961-964.

Scholten, et al., "FinFET Compact Modelling for Analogue and RF Applications," Electron Devices Meeting 2010, IEEE International Digital Object Identifier: 10.1109/IEDM.2010.5703322, 2010, p. 8.4.1-8.4.4.

Wu, et al., "Gate Resistance Modeling of Multifin MOS Devices," IEEE Electron Device Letters, vol. 27, No. 1, Jan. 2006, p. 68-70.

Tanabe, et al., "A Novel Monitoring Method of RF Characteristics Variations for Sub-0.1um MOSFETs with Precise Gate-Resistance Model," IEEE 2006 Custom Integrated Circuits Conference (CICC), 24-4-1, IEEE Digital Object Identifier: 10.1109/CICC.2006.320925, 2006, p. 725-728.

* cited by examiner

| Resistive Element# | $I_{k,in}$ | $I_{k,out}$ | $r_k$ |
|---|---|---|---|
| $372_1$ | 0 | $(.5p)/N_{fin}I_{g,1fin}$ | $2r^{(v)}$ |
| $372_2$ | 0 | $(p)/N_{fin}I_{g,1fin}$ | $r^{(v)}$ |
| $372_3$ | 0 | $(p)/N_{fin}I_{g,1fin}$ | $r^{(v)}$ |
| $372_4$ | 0 | $(p)/N_{fin}I_{g,1fin}$ | $r^{(v)}$ |
| $372_5$ | 0 | $(.5p)/N_{fin}I_{g,1fin}$ | $2r^{(v)}$ |
| $371_{12}$ | $(.5p)/N_{fin}I_{g,1fin}$ | $(.5p)/N_{fin}I_{g,1fin}$ | $r^{(s)}/2$ |
| $371_{11}$ | $(.5p)/N_{fin}I_{g,1fin}$ | $(.5p+q)/N_{fin}I_{g,1fin}$ | $r^{(w)}$ |
| $371_{10}$ | $(.5p+q)/N_{fin}I_{g,1fin}$ | $(.5p+q)/N_{fin}I_{g,1fin}$ | $r^{(s)}/2$ |
| $371_9$ | $((.5p+q)+(p))/N_{fin}I_{g,1fin}$ | $(1.5p+q)/N_{fin}I_{g,1fin}$ | $r^{(w)}$ |
| $371_8$ | $(1.5p+q)/N_{fin}I_{g,1fin}$ | $(1.5p+2q)/N_{fin}I_{g,1fin}$ | $r^{(s)}/2$ |
| $371_7$ | $(1.5p+2q)/N_{fin}I_{g,1fin}$ | $(1.5p+2q)/N_{fin}I_{g,1fin}$ | $r^{(w)}$ |
| $371_6$ | $((1.5p+2q)+(p))/N_{fin}I_{g,1fin}$ | $(2.5p+2q)/N_{fin}I_{g,1fin}$ | $r^{(s)}/2$ |
| $371_5$ | $(2.5p+2q)/N_{fin}I_{g,1fin}$ | $(2.5p+3q)/N_{fin}I_{g,1fin}$ | $r^{(w)}$ |
| $371_4$ | $(2.5p+3q)/N_{fin}I_{g,1fin}$ | $(2.5p+3q)/N_{fin}I_{g,1fin}$ | $r^{(s)}/2$ |
| $371_3$ | $((2.5p+3q)+(p))/N_{fin}I_{g,1fin}$ | $(3.5p+3q)/N_{fin}I_{g,1fin}$ | $r^{(w)}$ |
| $371_2$ | $(3.5p+3q)/N_{fin}I_{g,1fin}$ | $(3.5p+4q)/N_{fin}I_{g,1fin}$ | $r^{(s)}/2$ |
| $371_1$ | $(3.5p+4q)/N_{fin}I_{g,1fin}$ | $(3.5p+4q)/N_{fin}I_{g,1fin}$ | $r^{(w)}$ |
| $373_1$ | $((3.5p+4q)+(.5p))/N_{fin}I_{g,1fin}$ | $(4p+4q)/N_{fin}I_{g,1fin}$ | $r^{(e)}$ |

FIG. 3C

| Resistive Element# | $I_{k,in}$ | $I_{k,out}$ | $r_k$ |
|---|---|---|---|
| $472_1$ | 0 | $(.5p)/N_{fin}I_{g,1fin}$ | $2r^{(v)}$ |
| $472_2$ | 0 | $(p)/N_{fin}I_{g,1fin}$ | $r^{(v)}$ |
| $472_3$ | 0 | $(p)/N_{fin}I_{g,1fin}$ | $r^{(v)}$ |
| $472_4$ | 0 | $(p)/N_{fin}I_{g,1fin}$ | $r^{(v)}$ |
| $472_5$ | 0 | $(.5p)/N_{fin}I_{g,1fin}$ | $2r^{(v)}$ |
| $471_6$ | $(.5p)/N_{fin}I_{g,1fin}$ | $(.5p)/N_{fin}I_{g,1fin}$ | $r^{(s)}/2$ |
| $471_5$ | $(.5p)/N_{fin}I_{g,1fin}$ | $(.5p+q)/N_{fin}I_{g,1fin}$ | $r^{(w)}$ |
| $471_4$ | $(.5p+q)/N_{fin}I_{g,1fin}$ | $(.5p+q)/N_{fin}I_{g,1fin}$ | $r^{(s)}/2$ |
| $471_3$ | $((.5p+q)+(p))/N_{fin}I_{g,1fin}$ | $(1.5p+q)/N_{fin}I_{g,1fin}$ | $r^{(s)}/2$ |
| $471_2$ | $(1.5p+q)/N_{fin}I_{g,1fin}$ | $(1.5p+2q)/N_{fin}I_{g,1fin}$ | $r^{(w)}$ |
| $471_1$ | $(1.5p+2q)/N_{fin}I_{g,1fin}$ | $(1.5p+2q)/N_{fin}I_{g,1fin}$ | $r^{(s)}/2$ |
| $473_1$ | $((1.5p+2q)+(.5p))/N_{fin}I_{g,1fin}$ | $(2p+2q)/N_{fin}I_{g,1fin}$ | $r^{(e)}$ |
| $471_7$ | $(.5p)/N_{fin}I_{g,1fin}$ | $(.5p)/N_{fin}I_{g,1fin}$ | $r^{(s)}/2$ |
| $471_8$ | $(.5p)/N_{fin}I_{g,1fin}$ | $(.5p+q)/N_{fin}I_{g,1fin}$ | $r^{(w)}$ |
| $471_9$ | $(.5p+q)/N_{fin}I_{g,1fin}$ | $(.5p+q)/N_{fin}I_{g,1fin}$ | $r^{(s)}/2$ |
| $471_{10}$ | $((.5p+q)+(p))/N_{fin}I_{g,1fin}$ | $(1.5p+q)/N_{fin}I_{g,1fin}$ | $r^{(s)}/2$ |
| $471_{11}$ | $(1.5p+q)/N_{fin}I_{g,1fin}$ | $(1.5p+2q)/N_{fin}I_{g,1fin}$ | $r^{(w)}$ |
| $471_{12}$ | $(1.5p+2q)/N_{fin}I_{g,1fin}$ | $(1.5p+2q)/N_{fin}I_{g,1fin}$ | $r^{(s)}/2$ |
| $473_2$ | $((1.5p+2q)+(.5p))/N_{fin}I_{g,1fin}$ | $(2p+2q)/N_{fin}I_{g,1fin}$ | $r^{(e)}$ |

FIG. 4C

| Resistive Element # | $I_{k,in}$ | $I_{k,out}$ | $r_k$ |
|---|---|---|---|
| $572_1$ | 0 | $(.5p)/N_{fin}I_{g,1fin}$ | $2r^{(v)}$ |
| $572_2$ | 0 | $(p)/N_{fin}I_{g,1fin}$ | $r^{(v)}$ |
| $572_3$ | 0 | $(p)/N_{fin}I_{g,1fin}$ | $r^{(v)}$ |
| $572_4$ | 0 | $(p)/N_{fin}I_{g,1fin}$ | $r^{(v)}$ |
| $572_5$ | 0 | $(.5p)/N_{fin}I_{g,1fin}$ | $r^{(v)}$ |
| $572_6$ | 0 | $(.5q)/N_{fin}I_{g,1fin}$ | $2r^{(v)}$ |
| $571_8$ | 0 | $(.5q)/N_{fin}I_{g,1fin}$ | $r^{(w)}/2$ |
| $571_7$ | $(.5q)/N_{fin}I_{g,1fin}$ | $(.5q+p)/N_{fin}I_{g,1fin}$ | $r^{(s)}/2$ |
| $571_6$ | $((.5q)+(p))/N_{fin}I_{g,1fin}$ | $(.5q+p)/N_{fin}I_{g,1fin}$ | $r^{(s)}/2$ |
| $571_5$ | $(.5q+p)/N_{fin}I_{g,1fin}$ | $(1.5q+p)/N_{fin}I_{g,1fin}$ | $r^{(w)}/2$ |
| $571_4$ | $(1.5q+p)/N_{fin}I_{g,1fin}$ | $(1.5q+p)/N_{fin}I_{g,1fin}$ | $r^{(s)}/2$ |
| $571_3$ | $((1.5q+p)+(p))/N_{fin}I_{g,1fin}$ | $(1.5q+2p)/N_{fin}I_{g,1fin}$ | $r^{(s)}/2$ |
| $571_2$ | $(1.5q+2p)/N_{fin}I_{g,1fin}$ | $(2.5q+2p)/N_{fin}I_{g,1fin}$ | $r^{(w)}/2$ |
| $571_1$ | $(2.5q+2p)/N_{fin}I_{g,1fin}$ | $(2.5q+2p)/N_{fin}I_{g,1fin}$ | $r^{(s)}/2$ |
| $573_1$ | $((2.5q+2p)+(.5p))/N_{fin}I_{g,1fin}$ | $(2.5q+2.5p)/N_{fin}I_{g,1fin}$ | $r^{(e)}$ |
| $571_9$ | 0 | $(.5q)/N_{fin}I_{g,1fin}$ | $r^{(w)}/2$ |
| $571_{10}$ | $(.5q)/N_{fin}I_{g,1fin}$ | $(.5q+p)/N_{fin}I_{g,1fin}$ | $r^{(s)}/2$ |
| $571_{11}$ | $((.5q)+(p))/N_{fin}I_{g,1fin}$ | $(.5q+p)/N_{fin}I_{g,1fin}$ | $r^{(s)}/2$ |
| $571_{12}$ | $(.5q+p)/N_{fin}I_{g,1fin}$ | $(1.5q+p)/N_{fin}I_{g,1fin}$ | $r^{(w)}/2$ |
| $571_{13}$ | $(1.5q+p)/N_{fin}I_{g,1fin}$ | $(1.5q+p)/N_{fin}I_{g,1fin}$ | $r^{(s)}/2$ |
| $571_{14}$ | $((1.5q+p)+(p))/N_{fin}I_{g,1fin}$ | $(1.5q+2p)/N_{fin}I_{g,1fin}$ | $r^{(w)}/2$ |
| $571_{15}$ | $(1.5q+2p)/N_{fin}I_{g,1fin}$ | $(2.5q+2p)/N_{fin}I_{g,1fin}$ | $r^{(s)}/2$ |
| $571_{16}$ | $(2.5q+2p)/N_{fin}I_{g,1fin}$ | $(2.5q+2p)/N_{fin}I_{g,1fin}$ | $r^{(s)}/2$ |
| $573_2$ | $((2.5q+2p)+(.5p))/N_{fin}I_{g,1fin}$ | $(2.5q+2.5p)/N_{fin}I_{g,1fin}$ | $r^{(e)}$ |

FIG. 5C

MODELING GATE RESISTANCE OF A MULTI-FIN MULTI-GATE FIELD EFFECT TRANSISTOR

BACKGROUND

1. Field of the Invention

The embodiments disclosed herein relate to modeling parasitic resistances in semiconductor devices and, more particularly, to embodiments of a method, a system and a program storage device for modeling the total gate resistance of a multi-gate field effect transistor (MUGFET), which incorporates multiple semiconductor fins.

2. Description of the Related Art

Gate resistance of a field effect transistor (FET) is a relatively large parasitic resistance that will impact the performance of very large scale integration (VLSI) circuits, such as ring oscillators, logic gates (e.g., NAND gates, NOR gates, etc.), etc. Specifically, this parasitic resistance is associated with the flow of gate current (including both alternating current (AC) and gate leakage direct current ((DC)) from the FET channel region through the FET gate structure and the higher the gate resistance, the slower the switching speed of the FET. Thus, during FET design, accurate modeling of gate resistance is very important. Various techniques are well known in the art for modeling gate resistance for conventional planar FETs. Recently, however, multi-gate non-planar field effect transistors (MUGFETs) (e.g., dual-gate non-planar FETs, also referred to herein as fin-type FETs (FINFETs), and tri-gate non-planar FETs) and, particularly, multi-fin MUGFETs have been developed to provide reduced-size field effect transistors, while simultaneously providing enhanced control in short channel effects (SCE) and reducing drain induced barrier lowering (DIBL) significantly. Unfortunately, for such MUGFETs, the prior art gate resistance modeling techniques do not provide accurate results because of the complex three-dimensional geometries involved. Therefore, there is a need in the art for technique that can be used to more accurately model gate resistance of multi-fin MUGFETs.

SUMMARY

In view of the foregoing, disclosed herein are embodiments of a method, system and program storage device for accurately modeling the total gate resistance of a multi-fin multi-gate field effect transistor (i.e., a multi-fin MUGFET). Specifically, in these embodiments, a design for a multi-fin MUGFET comprises a gate structure with a horizontal portion, vertical portions and at least one gate contact. The horizontal portion traverses multiple semiconductor fins and comprises a plurality of first resistive elements connected in series. The vertical portions are adjacent to opposing sides of the semiconductor fins and comprise second resistive elements connected in parallel by the horizontal portion. The gate contact(s) land on the horizontal portion and comprise third resistive element(s). This design is accessed and analyzed to determine the total gate resistance based on resistance contributions from the first resistive elements, the second resistive elements and the third resistive element(s), particularly, where each resistive contribution is based on a resistance value of the resistive element, a first fraction of current from the semiconductor fins entering the resistive element and a second fraction of the current from the semiconductor fins exiting the resistive element.

More particularly, disclosed herein are embodiments of a computer-implemented method for accurately modeling the total gate resistance of a multi-fin multi-gate field effect transistor (i.e., a multi-fin MUGFET). In the method embodiments, a design for a multi-fin MUGFET is stored in a memory. This multi-fin MUGFET can comprise multiple semiconductor fins on a substrate, a gate structure adjacent to the semiconductor fins and at least one gate contact to the gate structure. Specifically, the gate structure can have a horizontal portion, which traverses the semiconductor fins and vertical portions, which are adjacent to opposing sides of the semiconductor fins. The horizontal portion can further be contacted, for example, by a single gate contact at one end of the gate structure or by a pair of gate contacts at opposing ends of the gate structure.

The multi-fin MUGFET design can be accessed and analyzed by a computer to determine the total resistance associated with the gate structure (i.e., the total gate resistance). Specifically, based on the design, a resistive network for the gate structure can be constructed by the computer to define all the resistive elements within the gate structure. These resistive elements can comprise, for example, first resistive elements connected in series within the horizontal portion; second resistive elements within the vertical portions and connected in parallel by the horizontal portion; and third resistive element(s) within the gate contact(s). Then, the resistive network can be used to determine resistance contributions to the total gate resistance from the various resistive elements (i.e., from the first resistive elements, the second resistive elements and the third resistive element(s)). Each resistance contribution of each resistive element can be based on the following: a resistance value of that resistive element; a first fraction of current from the semiconductor fins entering the resistive element; and a second fraction of the current from the semiconductor fins exiting the resistive element. More specifically, each resistance contribution of each resistive element can be based on the resistance value of that resistive element times a function of both the first fraction of current from the semiconductor fins entering the resistive element and the second fraction of the current from the semiconductor fins exiting the resistive element. The total gate resistance can be determined based on these various resistance contributions. More specifically, the total gate resistance can be calculated as the sum of the resistance contributions from the first resistive elements, the second resistive elements and the third resistive element(s), using, as applicable, simplified equations that account for any equivalent resistance values and/or current amounts.

Also disclosed herein are embodiments of a computer system for accurately modeling the total gate resistance of a multi-fin multi-gate field effect transistor (i.e., a multi-fin MUGFET). The computer system can comprise a memory and at least one processor. The memory can store a design for a multi-fin MUGFET. This multi-fin MUGFET can comprise multiple semiconductor fins on a substrate, a gate structure adjacent to the semiconductor fins and at least one gate contact to the gate structure. Specifically, the gate structure can have a horizontal portion, which traverses the semiconductor fins, and vertical portions, which are adjacent to opposing sides of the semiconductor fins. The horizontal portion can further be contacted, for example, by a single gate contact at one end of the gate structure or by a pair of gate contacts at opposing ends of the gate structure.

The processor(s) can access the multi-fin MUGFET design and can analyze it to determine the total resistance associated with the gate structure (i.e., the total gate resistance). Specifically, based on the design, the processor(s) can construct a resistive network for the gate structure that defines the various resistive elements. These resistive elements can comprise, for example, first resistive elements connected in series within the horizontal portion; second resistive elements within the vertical portions and connected in parallel by the horizontal portion; and third resistive element(s) within the gate contact (s).

Then, the resistive network can be used by the processor(s) to determine resistance contributions from the various resistive elements (i.e., from the first resistive elements, the second resistive elements and the third resistive element(s)). Each resistance contribution of each resistive element can be based on the following: a resistance value of that resistive element; a first fraction of current from the semiconductor fins entering the resistive element; and a second fraction of the current from the semiconductor fins exiting the resistive element. More specifically, each resistance contribution of each resistive element can be based on the resistance value of that resistive element times a function of both the first fraction of current from the semiconductor fins entering the resistive element and the second fraction of the current from the semiconductor fins exiting the resistive element. The total gate resistance can then be determined by the processor(s) based on these various resistance contributions. More specifically, the total gate resistance can be calculated as the sum of the resistance contributions from the first resistive elements, the second resistive elements and the third resistive element(s), using, as applicable, simplified equations that account for any equivalent resistance values and/or current amounts.

Also disclosed herein are embodiments of a non-transitory program storage device. This program storage device can be readable by a computer and can tangibly embody a program of instructions that is executable by the computer to perform the above-described method for accurately modeling the total gate resistance of a multi-fin multi-gate field effect transistor (i.e., a multi-fin MUGFET).

BRIEF DESCRIPTION OF THE DRAWINGS

The embodiments herein will be better understood from the following detailed description with reference to the drawings, which are not necessarily drawn to scale and in which:

FIG. 3C is a table illustrating, for each of the resistive elements of the resistive network of FIG. 3B, the corresponding resistance value $r_k$, the first fraction of current from the semiconductor fins entering the resistive element ($I_{k,in}$), and the second fraction of the current from the semiconductor fins exiting the resistive element ($I_{k,out}$);

FIG. 4C is a table illustrating, for each of the resistive elements of the resistive network of FIG. 4B, the corresponding resistance value $r_k$, the first fraction of current from the semiconductor fins entering the resistive element ($I_{k,in}$), and the second fraction of the current from the semiconductor fins exiting the resistive element ($I_{k,out}$);

FIG. 5C is a table illustrating, for each of the resistive elements of the resistive network of FIG. 5B, the corresponding resistance value $r_k$, the first fraction of current from the semiconductor fins entering the resistive element ($I_{k,in}$), and the second fraction of the current from the semiconductor fins exiting the resistive element ($I_{k,out}$)

DETAILED DESCRIPTION

Figure 1:
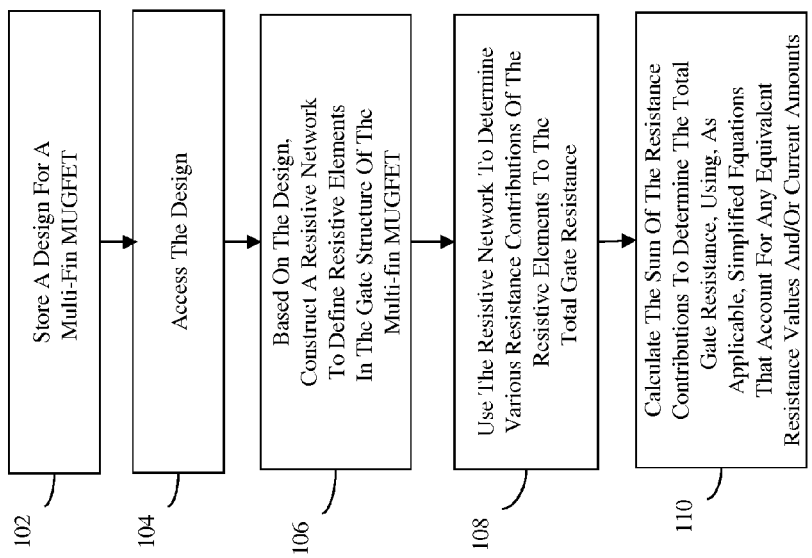
FIG. 1 is a flow diagram illustrating an embodiment of a gate resistance modeling method.

As mentioned above, gate resistance of a field effect transistor (FET) is a relatively large parasitic resistance that will impact the performance of very large scale integration (VLSI) circuits, such as ring oscillators, logic gates (e.g., NAND gates, NOR gates, etc.), etc. Specifically, this parasitic resistance is associated with the flow of gate current (including both alternating current (AC) and gate leakage direct current ((DC)) from the FET channel region through the FET gate structure and the higher the gate resistance, the slower the switching speed of the FET. Thus, during FET design, accurate modeling of gate resistance is very important. Various techniques are well known in the art for modeling gate resistance for conventional planar FETs.

Recently, however, multi-gate non-planar field effect transistors (MUGFETs) (e.g., dual-gate non-planar FETs, also referred to herein as fin-type FETs (FINFETs), and tri-gate non-planar FETs) and, particularly, multi-fin MUGFETs have been developed to provide reduced-size field effect transistors, while simultaneously providing enhanced control in short channel effects (SCE) and reducing drain induced barrier lowering (DIBL) significantly. Specifically, dual-gate non-planar FETs are non-planar FETs formed using a relatively thin semiconductor fin. In such a FET, a fully depleted channel region is formed in the center portion of the thin semiconductor fin and source and drain regions are formed in the end portions of the semiconductor fin on opposing sides of the channel region. A gate is formed on the top surface and opposing sides of the semiconductor fin adjacent to the channel region. A dielectric cap (e.g., a nitride cap) is positioned on the top surface of the semiconductor fin (i.e., between the top surface of the fin and the gate) and ensures that the FET exhibits only two-dimensional field effects. Tri-gate non-planar FETs are similar in structure to the dual-gate non-planar FETS, described above, except that the semiconductor fin of a tri-gate non-planar FET is relatively wide. In this case, the top surface of the semiconductor fin is not isolated from the gate by a dielectric cap and, thus, gate current can pass through the top surface of the semiconductor fin. It should be noted that the effective channel width of any of the above-described MUGFETs (e.g., of dual-gate and tri-gate non-planar FETs) and, thereby the device drive current can further be increased by incorporating multiple semiconductor fins into the MUGFET structure.

Unfortunately, for such MUGFETs, the prior art gate resistance modeling techniques do not provide accurate results because of the complex three-dimensional geometries involved. Therefore, there is a need in the art for technique that can be used to more accurately model gate resistance of multi-fin MUGFETs.

In view of the foregoing, disclosed herein are embodiments of a method, system and program storage device for accurately modeling the total gate resistance of a multi-fin multi-gate field effect transistor (i.e., a multi-fin MUGFET). Specifically, in these embodiments, a design for a multi-fin MUGFET comprises a gate structure with a horizontal portion, vertical portions and at least one gate contact. The horizontal portion traverses multiple semiconductor fins and comprises a plurality of first resistive elements connected in series. The vertical portions are adjacent to opposing sides of the semiconductor fins and comprise second resistive elements connected in parallel by the horizontal portion. The gate contact(s) land on the horizontal portion and comprise third resistive element(s). This design is accessed and analyzed to determine the total gate resistance based on resistance contributions from the first resistive elements, the second resistive elements and the third resistive element(s), particularly, where each resistive contribution is based on a resistance value of the resistive element, a first fraction of current from the semiconductor fins entering the resistive element and a second fraction of the current from the semiconductor fins exiting the resistive element.

More particularly, referring to the flow diagram of FIG. 1, disclosed herein are embodiments of a computer-implemented method for accurately modeling the total gate resistance of a multi-fin multi-gate field effect transistor (i.e., a multi-fin MUGFET), such as a multi-fin dual-gate FET or multi-fin tri-gate FET).

Figure 2:
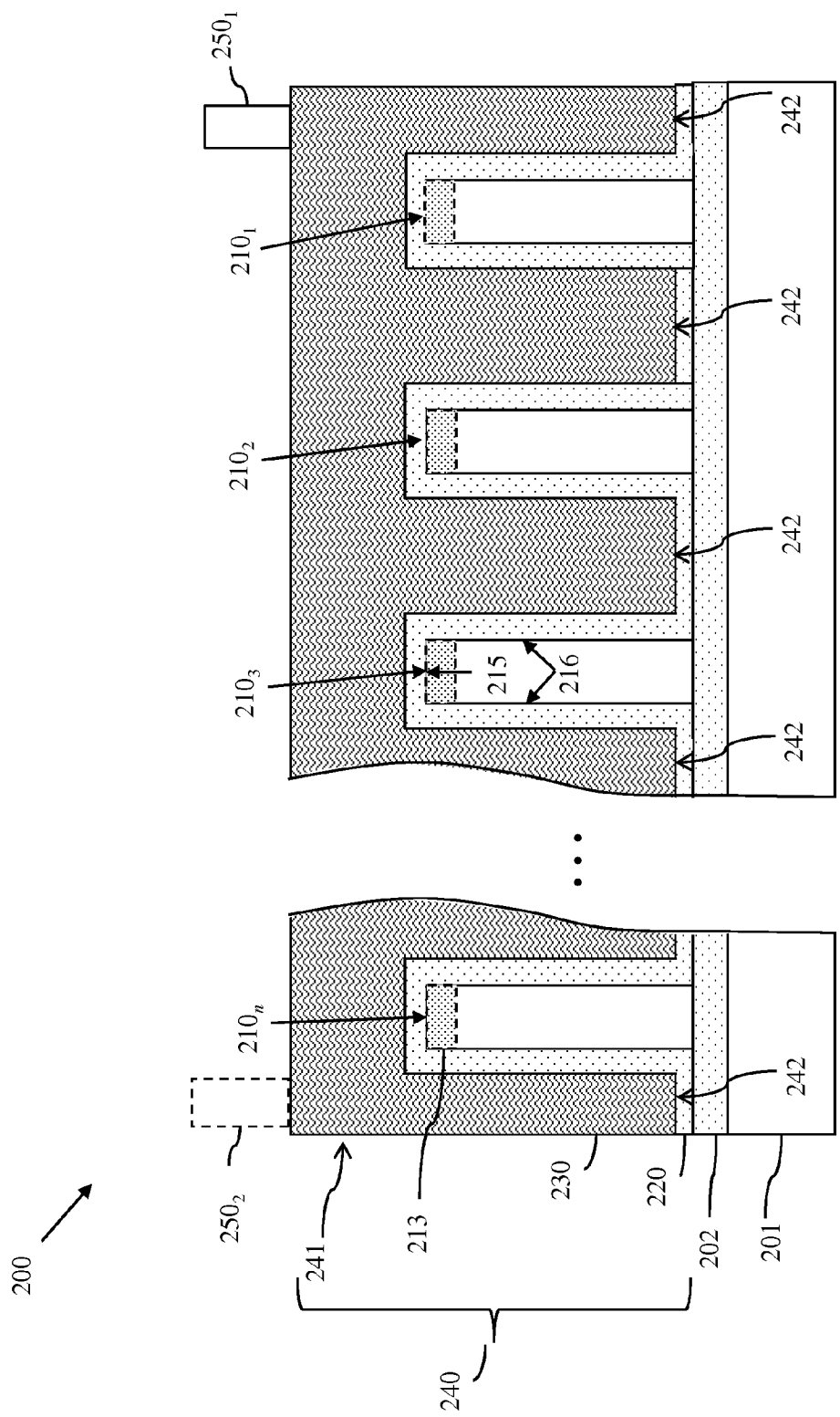
FIG. 2 is a cross-section diagram illustrating an exemplary multi-fin multi-gate field effect transistor (multi-fin MUGFET) design that can be stored and accessed according to the method of FIG. 1.

In these method embodiments, a multi-fin MUGFET design can be stored in memory (i.e., a computer readable storage medium) (102). As illustrated in FIG. 2, an exemplary multi-fin MUGFET 200 can comprise a plurality of essentially parallel semiconductor fins $210_{1-n}$. These semiconductor fins $210_{1-n}$ can comprise, for example, silicon fins, gallium nitride fins, or fins etched from any other suitable semiconductor material. For purposes of this disclosure, a semiconductor fin refers to a relatively thin, vertically oriented, essentially rectangular, three-dimensional semiconductor body, which is patterned and etched, for example, from a semiconductor layer (e.g., a silicon layer, a gallium nitride layer, or any other suitable semiconductor layer) of a semiconductor-on-insulator (SOI) wafer. Thus, the semiconductor fins $214_{1-n}$ can be positioned on the top surface of an insulator layer 202 (e.g., a silicon dioxide ($SiO_2$) layer, a sapphire layer or any other suitable insulator layer) above a semiconductor substrate 201 (e.g., a silicon substrate or any other suitable semiconductor substrate). Those skilled in the art will recognize that when the multi-fin MUGFET 200 comprises a dual-gate FET (as opposed to a tri-gate FET), each of the semiconductor fins $210_{1-n}$ can be capped with a dielectric cap 213 (e.g., a silicon nitride cap, a silicon oxide cap, a silicon oxynitride cap or any other suitable dielectric cap). Additionally, it should be noted that, for purposes of illustration the multi-fin MUGFET 200 is shown in FIG. 2 as having four semiconductor fins; however, it should be understood that such a multi-fin MUGFET 200 may have any number of two or more semiconductor fins. Each of the semiconductor fins $210_{1-n}$ can have a center portion, which comprises a channel region, positioned laterally between end portions, which comprise source/drain regions (not shown). Depending upon the multi-fin MUGFET 200 design, the end portions of adjacent semiconductor fins may be either electrically isolated from each other or electrically connected (i.e., the source/drain regions may be merged).

A gate structure 240 can traverse the center portions (i.e., the channel regions) of the semiconductor fins $210_{1-n}$ such that it has a horizontal portion 241 positioned adjacent to the top surface 215 of each semiconductor fin and vertical portions 242 positioned adjacent to the opposing sidewalls 216 of each semiconductor fin. More specifically, the gate structure 240 can comprise a conformal gate dielectric layer 220 (e.g., a relatively thin silicon dioxide ($SiO_2$) layer, silicon nitride (SiN) layer, silicon oxynitride (SiON) layer, high-k dielectric layer, or any other suitable gate dielectric layer), which conformally covers the top surface 215 and opposing sidewalls 216 of each center portion of each semiconductor fin. The gate structure 240 can further comprise a gate conductor layer 230 (e.g., a doped polysilicon layer, a metal layer or any other suitable gate conductor layer) stacked above the conformal dielectric layer 220. Such gate structures are well known in the art and, thus, the details thereof are omitted form this specification in order to allow the reader to focus on the salient aspects of the embodiments.

As mentioned above, gate resistance is a relatively large parasitic resistance that will impact the FET performance. In the case of a multi-fin MUGFET 200, such as that shown in FIG. 2, gate resistance refers to the resistance associated with the flow of gate current from the channel regions within all of the semiconductor fins $210_{1-n}$ through the gate structure 240. It should be noted that, since the semiconductor fins $210_{1-n}$ are essentially identical, the same amount of gate current will flow from each one of the semiconductor fins $210_{1-n}$ into the gate structure 240. That is, the amount of gate current entering the gate structure 240 from each one of the semiconductor fins ($I_{g,1fin}$) will be the same for all of the N semiconductor fins such that $N_{fin}$ times $I_{g,1fin}$ will be equal to the total amount of gate current exiting the gate structure 240 ($I_{g,total}$) at the gate contact(s). Furthermore, for each semiconductor fin, $I_{g,1fin}$ is equal to the sum of an amount of gate current (p) exiting the opposing sidewalls 216 (such that p/2 is the amount of gate current exiting a single one of the sidewalls 216) and an amount of gate current (q) exiting the top surface 215. It should be noted that, as mentioned above, the semiconductor fins of a multi-fin dual-gate MUGFET are capped with a dielectric cap 213. Thus, for a multi-fin dual-gate MUGFET, q will always be equal to zero.

Referring again to FIG. 1, this multi-fin MUGFET 200 design of FIG. 2 can be accessed (104) and analyzed by a computer to determine the total resistance associated with the gate structure 250 (i.e., the total gate resistance) (106)-(110).

Specifically, based on the design, a resistive network for the gate structure 250 can be constructed by the computer to define all the resistive elements within the gate structure 250 (106). These resistive elements can comprise, for example, first resistive elements connected in series within the horizontal portion 241; second resistive elements within the vertical portions 242 and connected in parallel by the horizontal portion 241; and third resistive element(s) within the gate contact (s) $250_1$ or $250_{1-2}$. As discussed in greater detail below with respect to specific examples, the number and location of the various resistive elements will depend, not only upon, the number of semiconductor fins, but also on the number and location(s) of the gate contact(s). Thus, the process of constructing the resistive network can comprise accessing the design to determine the number of semiconductor fins $210_{1-n}$ and the number of gate contacts (e.g., a single gate contact $250_1$ at one end of the gate structure 240 or a pair of gate contacts $250_{1-2}$ at opposing ends of the gate structure 240. Then, the first resistive elements (i.e., the series-connected resistive elements within the horizontal portion 241 of the gate structure) can be defined based on both the number of semiconductor fins $210_{1-n}$ and the number of gate contacts $250_1$ or $250_{1-2}$. Additionally, the second resistive elements (i.e., the parallel-connected resistive elements with the vertical portions 242 of the gate structure) can be defined based on the number of the semiconductor fins $210_{1-n}$ (and whether that number is an odd or even number) and the third resistive element(s) (i.e., the resistive element(s) within the gate contact(s)) can be defined based on the number of the gate contacts $250_1$ or $250_{1-2}$.

Then, the resistive network, which was previously constructed at process 106, can be used by the computer to determine resistance contributions to the total gate resistance from the various resistive elements (i.e., from the first resistive elements, the second resistive elements and the third resistive element(s)) (108). As mentioned above, each resistance contribution of each resistive element k can be based on the following: a resistance value $r_k$ of that resistive element k; a first fraction of current from the semiconductor fins entering the resistive element ($I_{k,in}$); and a second fraction of the current from the semiconductor fins exiting the resistive element ($I_{k,out}$). More specifically, each resistance contribution of each resistive element k can be calculated as follows: the resistance value $r_k$ of that resistive element k times a function of both the first fraction of current from the semiconductor fins entering the resistive element k ($I_{k,in}$) and the second fraction of the current from the semiconductor fins exiting the resistive element k ($I_{k,in}$). That is, each resistance contribution can be calculated as: $A(I_{k,in}, I_{k,out})r_k$.

As discussed in greater detail below with respect to specific examples, the fraction of current from the semiconductor fins entering a resistive element and the fraction of the current from the semiconductor fins exiting the resistive element will vary depending upon the type of resistive element (i.e., whether the first resistive element located within the horizontal portion 241 of the gate structure 240, a second resistive element located within a vertical portion 242 of the gate structure 240, or a third resistive element located within a gate contact) and its location within the network.

The total gate resistance $R_g$ can then be determined based on these various resistance contributions (110). More specifically, the total gate resistance $R_g$ can be calculated as the sum of the resistance contributions from the first resistive elements, the second resistive elements and the third resistive elements, using, if applicable, simplified expressions that account for any equivalent resistance values and/or current amounts.

Figure 3A:
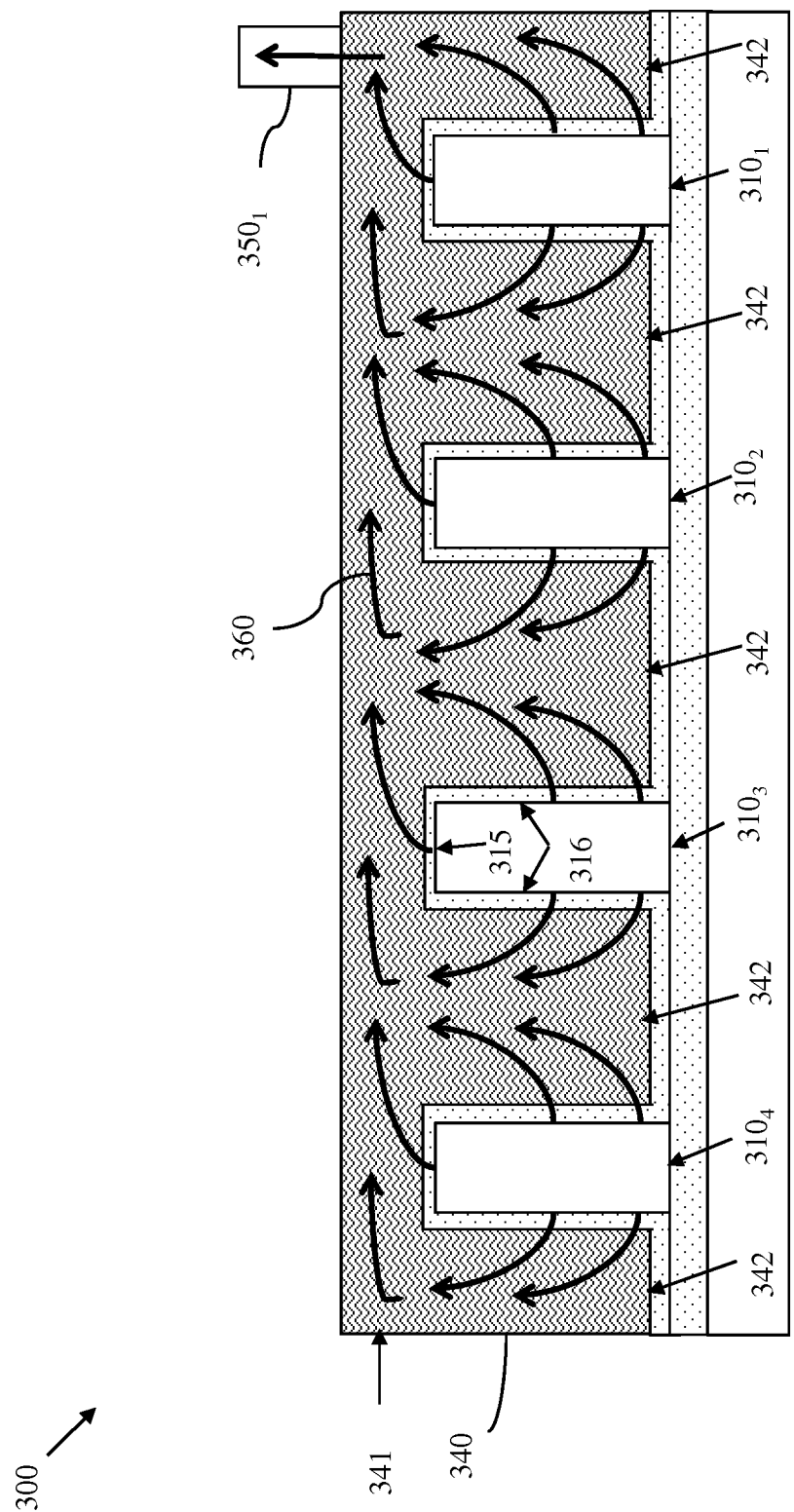
FIG. 3A is a cross-section diagram illustrating another exemplary multi-fin MUGFET design that can be stored and accessed according to the method of FIG. 1.

More particularly, FIG. 3A is shows an exemplary multifin MUGFET 300 design that can be accessed at process 104. This multi-fin MUGFET 300 can be configured in essentially the same manner as described in detail above with regard to the multi-fin MUGFET 200 design of FIG. 2. That is, it can comprise a gate structure 340 that traverses the center portions (i.e., the channel regions) of the multiple semiconductor fins $310_1$-$310_4$ such that it has a horizontal portion 341 positioned adjacent to the top surface 315 of each semiconductor fin and vertical portions 342 positioned adjacent to the opposing sidewalls 316 of each semiconductor fin. However, in this case, the multi-fin MUGFET 300 has four semiconductor fins $310_1$-$310_4$ and the gate structure 340 that is contacted at only one end by a single gate contact $350_1$. As illustrated, when a multi-fin MUGFET is configured in this manner, gate current 360 will flow from the opposing sidewalls 316 (and, in the case of a tri-gate FET, from the top surface 315) of each of the semiconductor fins $310_1$-$310_4$ into the gate structure 340 and then towards the single gate contact $350_1$.

Figure 3B:
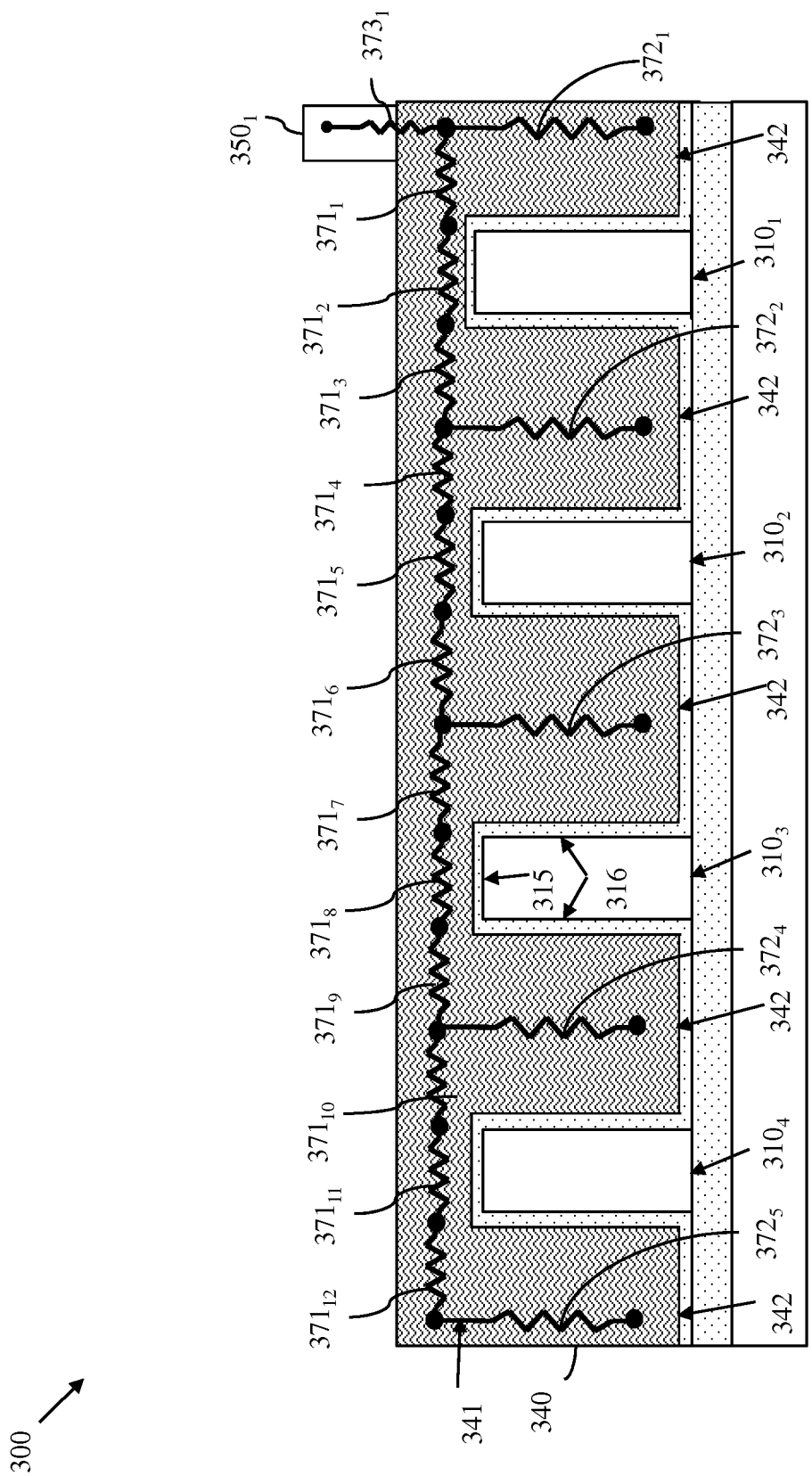
FIG. 3B is an illustration of a resistive network that can be constructed for the multi-fin MUGFET of FIG. 3A according to the method of FIG. 1.

FIG. 3B shows an exemplary resistive network that can be constructed at process 106 for such a multi-fin MUGFET 300 design. Since the number of gate contacts is one (i.e., since a single gate contact $350_1$ is positioned at one end of the horizontal portion 341 of the gate structure 340), a single third resistive element $373_1$ at one end of the gate structure 340 can be defined. Since the number of semiconductor fins $310_1$-$310_4$ is four, five second resistive elements $372_1$-$372_5$ can be defined such that each semiconductor fin is positioned laterally between two second resistive elements. That is, the number of second resistive elements will be equal to the number of semiconductor fins ($N_{fin}$) plus one. Since the number of gate contacts is only one, then irrespective of the number of semiconductor fins (even or odd), the first resistive elements should be defined such that, above each semiconductor fin $310_1$-$310_4$, there is one resistive element aligned with a top surface of the semiconductor fin and two other resistive elements that extend laterally beyond opposing sidewalls of the semiconductor fin. The length of these two other resistive elements can be equal to half the width of the space between two adjacent fins. Consequently, since the number of semiconductor fins ($N_{fin}$) in the exemplary multi-fin MUGFET 300 design of FIG. 3A is four, the total number of first resistive elements will be twelve (i.e., see first resistive elements $371_1$-$371_{12}$) and these twelve first resistive elements will be configured as follows: the first resistive element $371_2$ will be aligned with the top surface 315 of the semiconductor fin $310_1$ and the immediately adjacent first resistive elements $371_1$ and $371_3$ will extend laterally beyond the opposing sidewalls 316 of semiconductor fin $310_1$; the first resistive element $371_5$ will be aligned with the top surface 315 of semiconductor fin $310_2$ and the immediately adjacent first resistive elements $371_4$ and $371_6$ will extend laterally beyond the opposing sidewalls of semiconductor fin $310_2$; and so on.

Once the resistive network, as shown in FIG. 3B, is constructed at process 106, the resistive contribution of each of the resistive elements (i.e., each of the first resistive elements $371_1$-$371_{12}$, each of the second resistive elements $372_1$-$372_5$, and the third resistive element $373_1$) can be determined (108). As mentioned above, each resistance contribution to total gate resistance of each resistive element k can be determined based on the following: a resistance value $r_k$ of that resistive element k; a first fraction of current from the semiconductor fins entering that resistive element ($I_{k,in}$); and a second fraction of the current from the semiconductor fins exiting the resistive element ($I_{k,out}$). More specifically, each resistance contribution of each resistive element k can be calculated as follows: the resistance value $r_k$ of that resistive element k times a function of both the first fraction of current from the semiconductor fins entering the resistive element k ($I_{k,in}$) and the second fraction of the current from the semiconductor fins exiting the resistive element k ($I_{k,out}$). That is, each resistance contribution can be calculated as: $A(I_{k,in}, I_{k,out})r_k$. As discussed in greater detail below, this function can be equal to one third (⅓) times the sum of the following: (i) the square of the first fraction of current from the semiconductor fins entering the resistive element, (ii) the square of the second fraction of current from the semiconductor fins exiting the resistive element, and (iii) the product of the first fraction of current from the semiconductor fins entering the resistive element and the second fraction of current from the semiconductor fins exiting the resistive element.

Table of FIG. 3C is provided to show, for each of the resistive elements $371_1$-$371_{12}$, $372_1$-$372_5$, and $373_1$, the corresponding resistance value $r_k$, first fraction of current 360 from the semiconductor fins $310_1$-$310_4$ entering the resistive element ($I_{k,in}$), and second fraction of the current from the semiconductor fins exiting the resistive element ($I_{k,out}$). It should be noted that given the resistive network defined at process 108, values for $r_k$, $I_{k,in}$, and $I_{k,out}$ for some resistive elements are equal to or proportional to the same values for other resistive elements.

Specifically, the semiconductor fins $310_{1-4}$ of the multi-fin MUGFET 300 are essentially identical. Thus, the same amount of gate current will flow from each one of the semiconductor fins $310_{1-4}$ into the gate structure 340 toward the gate contact $350_1$. That is, the amount of gate current entering the gate structure 340 from each fin ($I_{g,1fin}$) will be the same and the sum thereof will be equal to the total amount of gate current exiting the gate structure 340 ($I_{g,total}$) at the gate contact $350_1$. Furthermore, for each semiconductor fin, $I_{g,1fin}$ is equal to the sum of an amount of gate current (p) exiting the opposing sidewalls 316 (such that p/2 is the amount of gate current exiting a single one of the sidewalls 316) and an amount of gate current (q) exiting the top surface 315.

As mentioned above, the semiconductor fins of a multi-fin dual-gate MUGFET are capped with a dielectric cap (not shown in FIG. 3A). Thus, for a multi-fin dual-gate MUGFET, q will always be equal to zero and, for any of the first resistive elements that are aligned with a top surface of a semiconductor fin capped with a dielectric cap, the difference between the first fraction $I_{k,in}$ and the second fraction $I_{k,out}$ will also be equal to zero.

Additionally, the first fraction of current $I_{k,in}$ at the input of each of the second resistive elements $372_{1-5}$ will be zero. The second resistive elements $372_{2-4}$, which are positioned laterally between two fins and which thereby receive current from the sidewalls of the two fins, will have a second fraction of current $I_{k,out}$ at the output of p. However, the second resistive elements $372_1$ and $372_5$, which are on the outside of the gate structure, will have a second fraction of current $I_{k,out}$ at the output of 0.5p. Since all current 360 turns towards the single gate contact $350_1$, the fractions of current $I_{k,in}$ and $I_{k,out}$ will increase from the first resistive element $371_{12}$, which is farthest from the gate contact $350_1$, toward the first resistive element $371_1$, which is closest to the gate contact $350_1$, as current from the opposing sidewalls and top surface of more semiconductor fins travels towards the gate contact $350_1$.

Furthermore, the resistance value of each first resistive element aligned above a semiconductor fin (e.g., see first resistive elements $371_2$, $371_5$, $371_8$, and $371_{11}$) will be the same resistance value $r^{(w)}$ (i.e., a resistance value associated with a segment of the gate structure having a length equal to the width of a semiconductor fin) and the resistance value of all other first resistive elements (e.g., see first resistive elements $371_1$, $371_{3-4}$, $371_{6-7}$, $371_{9-10}$, and $371_{12}$) will be the same resistance value $r^{(s)}/2$ (i.e., a resistance value associated with a segment of the gate structure having a length equal to half the width of the space between two fins). Furthermore, the resistance value of each second resistive element positioned laterally between two fins (e.g., see second resistive elements $372_2$, $372_3$, and $372_4$) will be $r^{(v)}$ (i.e., a resistance value associated with a vertical segment of the gate structure having a length equal to the height of the fins and a width equal to the width space between two fins) and the resistance value of each of the two outer second resistive elements (e.g., see second resistive elements $372_1$ and $372_5$) will be $2r_{(v)}$ (i.e., a resistance value associated with a vertical segment of the gate structure having a length equal to the height of the fins and a width equal to the half the width of the space between two fins).

Consequently, the total gate resistance $R_g$ can be solved in this case at process 110 using the following master equation:

$$R_g = \sum_k A(I_{k,in}, I_{k,out})r_k, \tag{1}$$

where $r_k$ is the resistance value of a resistive element k and $A(I_{k,in}, I_{k,out})$ is function of both the first fraction of current from the semiconductor fins entering the resistive element k ($I_{k,in}$) and the second fraction of the current from the semiconductor fins exiting the resistive element k ($I_{k,out}$). In this case, $AI_{k,in}, I_{k,out}$) can a symmetrical function where the order of the arguments and $I_{k,out}$ doesn't matter. For example, when the current inside the resistive element k increases linearly along the top surface of a semiconductor fin, the function $A(I_{k,in}, I_{k,out})$ can be calculated by using the following explicit expression:

$$A(I_{in}, I_{out}) = A(I_{out}, I_{in}) = \frac{1}{3}(I_{in}^2 + I_{out}^2 + I_{in}I_{out}). \tag{2a}$$

In other words, this function can be equal to one third (⅓) times the sum of the following: (i) the square of the first fraction of current from the semiconductor fins entering the resistive element, (ii) the square of the second fraction of current from the semiconductor fins exiting the resistive element, and (iii) the product of the first fraction of current from the semiconductor fins entering the resistive element and the second fraction of current from the semiconductor fins exiting the resistive element.

The expression of the function $A(I_{in}, I_{out})$ is simplified when the current entering and exiting the resistive element k are the same, $I_{in} = I_{out}$, $$A(I,I) = I^2. \tag{2b}$$

Thus, for a multi-fin MUGFET such as that shown in FIG. 3, where there is only a single gate contact, the master equation (1) becomes:

$$R_v = \tag{3}$$
$$\left(\frac{p/2}{N_{fin}I_{g,1fin}}\right)^2 2r^{(v)} + (N_{fin} - 1)\left(\frac{p}{N_{fin}I_{g,1fin}}\right)^2 r^{(v)} + \left(\frac{p/2}{N_{fin}I_{g,1fin}}\right)^2 2r^{(v)} +$$
$$N_{gcon} \sum_{n=1}^{N} \left[a_n^2 \frac{r^{(s)}}{2} + A(a_n, b_n)r^{(w)} + b_n^2 \frac{r^{(s)}}{2}\right] + N_{gcon}\left(\frac{1}{N_{gcon}}\right)^2 r^{(e)},$$

where $N_{fin}$ is the total number of semiconductor fins, where $N_{gcon}$ is the total number of gate contacts (either 1 or 2), where $r^{(v)}$ is a resistance value associated with a vertical segment of the gate structure having a length equal to the height of the fins and a width equal to the width space between two fins, where $r^{(w)}$ is the resistance value associated with a segment of the gate structure having a length equal to the width of a semiconductor fin, where $r^{(s)}$ is the resistance value associated with a segment of the gate structure having a length equal to the width of the space between two fins, where $r^{(e)}$ is the resistance value associated with a gate contact, where p is an amount of gate current entering the gate structure from the opposing sides of a semiconductor fin, where q is an amount of gate current entering the gate structure from the top surface of a semiconductor fin, where the sum (p+q) is equal to the total amount of current flowing into the gate structure from a single fin $I_{g,1fin}$, $p+q=I_{g,1fin}$, and where $$a_n = \frac{\left(n-\frac{1}{2}\right)p + (n-1)q}{N_{fin}I_{g,1fin}}, b_n = \frac{\left(n-\frac{1}{2}\right)p + nq}{N_{fin}I_{g,1fin}}, \text{ and} \quad (4)$$

$$N = \frac{N_{fin}}{N_{gcon}}.$$

Long expression (3) can be simplified as follows:

$$R_g = \frac{N_{fin}r^{(h)}}{3N_{gcon}^2} + \frac{1}{N_{fin}}\left(r^{(v)}\tilde{p}^2 - \frac{1-\tilde{q}^2}{12}r^{(h)} + \frac{\tilde{q}^2 r^{(s)}}{6}\right) + \frac{r^{(e)}}{N_{gcon}}, \quad (5)$$

where $$\tilde{p} = \frac{p}{I_{g,1fin}} \quad (6a)$$

is a relative amount of gate current entering the gate structure from the opposing sides of a semiconductor fin, where $$\tilde{q} = \frac{q}{I_{g,1fin}} \quad (6b)$$

is a relative amount of gate current entering the gate structure from the top surface of a semiconductor fin, where $$\tilde{p} + \tilde{q} = 1, \quad (6c)$$

and where $$r^{(h)} = r^{(s)} + r^{(w)}. \quad (6d)$$

Figure 4A:
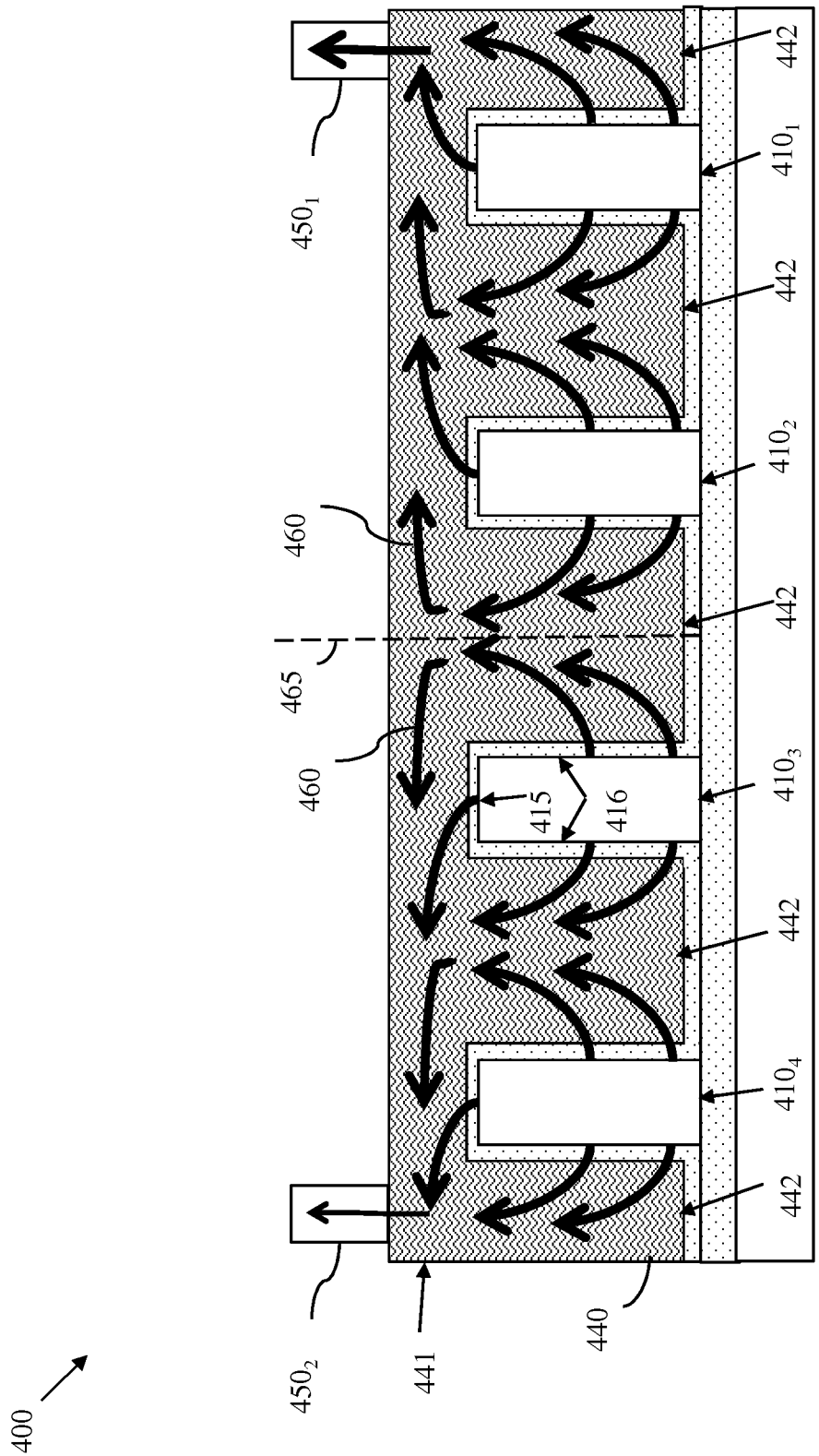
FIG. 4A is a cross-section diagram illustrating another exemplary multi-fin MUGFET design that can be stored and accessed according to the method of FIG. 1.

FIG. 4A shows another exemplary multi-fin MUGFET 400 design that can be accessed at process 104. This multi-fin MUGFET 400 can be configured in essentially the same manner as described in detail above with regard to the multi-fin MUGFET 200 design of FIG. 2. That is, it can comprise a gate structure 440 that traverses the center portions (i.e., the channel regions) of the multiple semiconductor fins $410_1$-$410_4$ such that it has a horizontal portion 441 positioned adjacent to the top surface 415 of each semiconductor fin and vertical portions 442 positioned adjacent to the opposing sidewalls 416 of each semiconductor fin. However, in this case, the multi-fin MUGFET 400 has four semiconductor fins $410_1$-$410_4$ and, particularly, an even number of semiconductor fins and the gate structure 440 is contacted at opposing ends by two gate contacts $450_1$ and $450_2$. As illustrated, when a multi-fin MUGFET is configured in this manner, gate current 460 will flow from the opposing sidewalls 416 (and, in the case of a tri-gate FET, from the top surface 415) of each of the semiconductor fins $410_1$-$410_4$ into the gate structure 440. However, since the gate structure 440 is contacted by two contacts on the opposing ends of the gate structure, current from the semiconductor fins $410_1$-$410_2$ to the right of a central current dividing point 465 will turn right towards the gate contact $450_1$ and current from the semiconductor fins $410_3$-$410_4$ to the left of the central current dividing point 465 will turn left towards the other gate contact $450_2$.

Figure 4B:
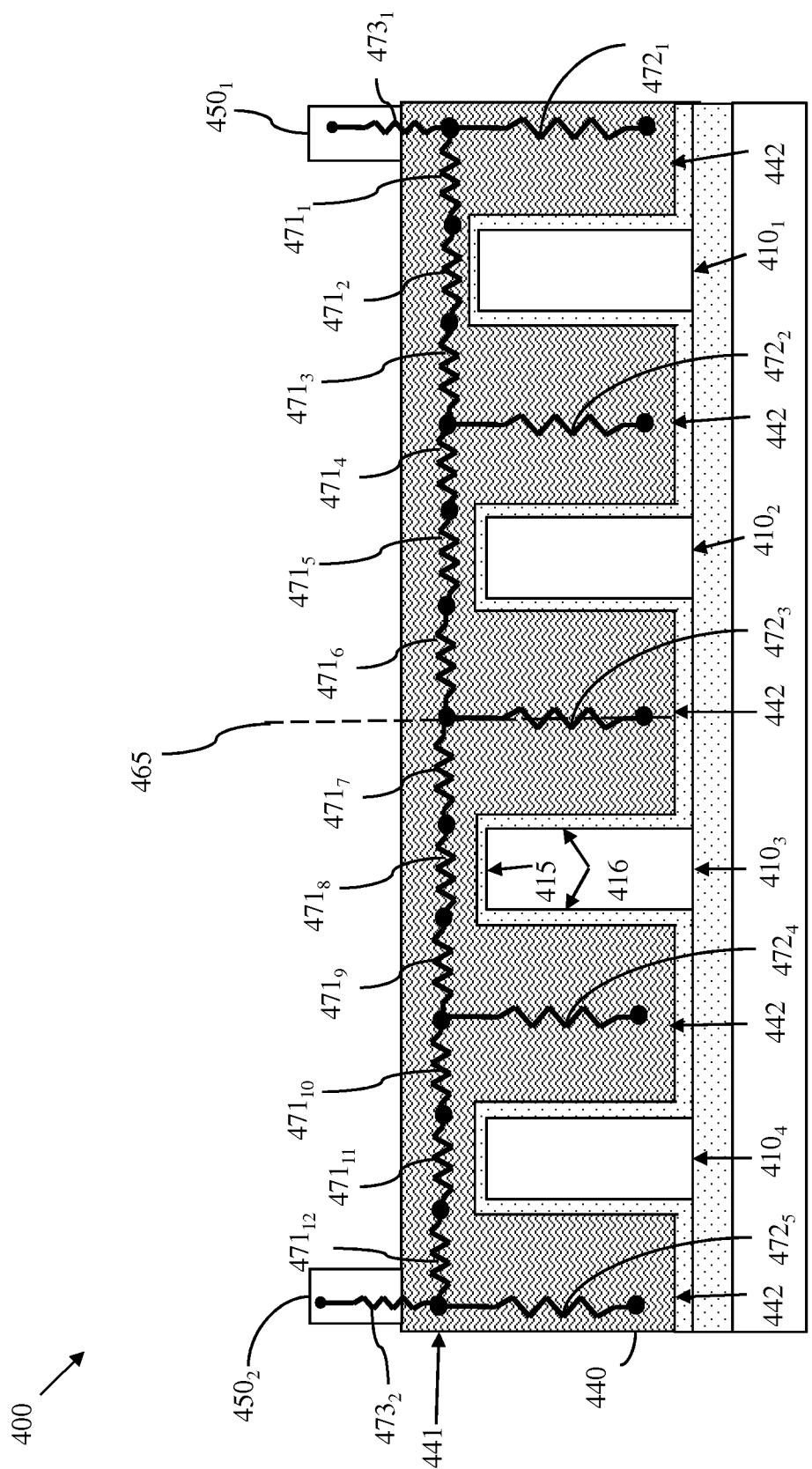
FIG. 4B is an illustration of a resistive network that can be constructed for the multi-fin MUGFET of FIG. 4A according to the method of FIG. 1.

FIG. 4B shows an exemplary resistive network that can be constructed at process 106 for such a multi-fin MUGFET 400 design. Since the number of gate contacts is two (i.e., since gate contacts $450_1$ and $450_2$ are positioned at opposing ends of the horizontal portion 441 of the gate structure 440), two third resistive elements $473_1$ and $473_2$ can be defined at the ends of the gate structure 440. Additionally, since the number of semiconductor fins $410_1$-$410_4$ is four, five second resistive elements $472_1$-$472_5$ can be defined such that each semiconductor fin is positioned laterally between two second resistive elements. That is, the number of second resistive elements will be equal to the number of semiconductor fins ($N_{fin}$) plus one. Since the number of gate contacts is two there is a central current dividing point 465 and since the number of semiconductor fins is an even number (in this case four), this central current dividing point 465 will fall between two adjacent semiconductor fins (see fins $410_3$ and $410_2$) as opposed to on a single semiconductor fin. Thus, the first resistive elements can be defined in the same manner as discussed above in the exemplary resistive network of FIG. 3B. That is, above each semiconductor fin, there is one resistive element aligned with a top surface of the semiconductor fin and two other resistive elements that extend laterally beyond opposing sidewalls of the semiconductor fin. The length of these two other resistive elements can be equal to half the width of the space between two adjacent fins.

As mentioned above, the semiconductor fins of a multi-fin dual-gate MUGFET are capped with a dielectric cap (not shown in FIG. 4A). Thus, for a multi-fin dual-gate MUGFET, q will always be equal to zero and, for any of the first resistive elements that are aligned with a top surface of a semiconductor fin capped with a dielectric cap, the difference between the first fraction $I_{k,in}$ and the second fraction $I_{k,out}$ will also be equal to zero.

Additionally, since the number of semiconductor fins ($N_{fin}$) in the exemplary multi-fin MUGFET 400 design of FIG. 4A is four, the total number of first resistive elements will be twelve (i.e., see first resistive elements $471_1$-$471_{12}$) and these twelve first resistive elements will be configured as follows: the first resistive element $471_2$ will be aligned with the top surface 415 of the semiconductor fin $410_1$ and the first resistive elements $471_1$ and $471_3$ will extend laterally beyond the opposing sidewalls 416 of semiconductor fin $410_1$; the first resistive element $471_5$ will be aligned with the top surface 415 of semiconductor fin $410_2$ and the first resistive elements $471_4$ and $471_6$ will extend laterally beyond the opposing sidewalls of semiconductor fin $410_2$; and so on.

Once the resistive network, as shown in FIG. 4B, is constructed at process 106, the resistive contribution of each of the resistive elements (i.e., each of the first resistive elements $471_1$-$471_{12}$, each of the second resistive elements $472_1$-$472_5$, and the third resistive elements $473_1$ and $473_2$) can be determined (108). As mentioned above, each resistance contribution of each resistive element k can be based on the following: a resistance value $r_k$ of that resistive element k; a first fraction of current from the semiconductor fins entering the resistive element ($I_{k,in}$); and a second fraction of the current from the semiconductor fins exiting the resistive element ($I_{k,out}$). More specifically, each resistance contribution of each resistive element k can be calculated as follows: resistance value $r_k$ of that resistive element k times a function of both the first fraction of current from the semiconductor fins entering the resistive element k ($I_{k,in}$) and the second fraction of the current from the semiconductor fins exiting the resistive element k ($I_{k,out}$). That is, each resistance contribution can be calculated as: $A(I_{k,in}, I_{k,out})r_k$.

Since the only difference between the MUGFET 300 design of FIG. 3A and the MUGFET 400 design of FIG. 4A is the additional gate contact, the resistance values $r_k$ of the various resistive elements will be the same. However, since the current from half of the semiconductor fins $410_1$-$410_2$ will flow to one gate contact $450_1$ and current from the other half of the semiconductor fins $410_3$-$410_4$ will flow to the other gate contact $450_2$, the fractional current amounts and, thereby the resistance contribution associated with the various resistive elements may vary.

Table of FIG. 4C is provided to show, for each of the resistive elements $471_1$-$471_{12}$, $472_1$-$472_5$, and $473_1$-$473_2$, the corresponding resistance value $r_k$, first fraction of current 460 from the semiconductor fins $410_1$-$410_4$ entering the resistive element ($I_{k,in}$), and second fraction of the current from the semiconductor fins exiting the resistive element ($I_{k,out}$). Again, it should be noted that, given the resistive network defined at process 108, values for $r_k$, $I_{k,in}$, and $I_{k,out}$ for some resistive elements are equal to or proportional to the same values for other resistive elements.

Specifically, the semiconductor fins $410_{1-4}$ of the multi-fin MUGFET 400 are essentially identical and the two halves of the gate structure 440, as defined by the central current dividing point 465 are essentially symmetrical, the same amounts of gate current will flow into each of the gate contacts $450_1$ and $450_2$. That is, the amount of gate current entering the gate structure 440 from each fin ($I_{g,1fin}$) will be the same, the sum thereof will be equal to the total amount of gate current ($I_{g,total}$), and half of this amount will exit the gate structure 440 at the gate contact $450_1$ and the other half of this amount will exit the gate structure at gate contact $450_1$.

Furthermore, for each semiconductor fin, $I_{g,1fin}$ is equal to the sum of an amount of gate current (p) exiting the opposing sidewalls 416 (such that p/2 is the amount of gate current exiting a single one of the sidewalls 416) and an amount of gate current (q) exiting the top surface 415. As mentioned above, the semiconductor fins of a multi-fin dual-gate MUGFET are capped with a dielectric cap (not shown in FIG. 4A). Thus, for a multi-fin dual-gate MUGFET, q will always be equal to zero. Consequently, the first fraction of current $I_{k,in}$ at the input of each of the second resistive elements $472_{1-5}$ will be zero. The second resistive elements $472_{2-4}$, which are positioned laterally between two fins and which thereby receive current from the sidewalls of the two fins, will have a second fraction of current $I_{k,out}$ at the output of p. However, the second resistive elements $472_1$ and $472_5$, which are on the outside of the gate structure, will have a second fraction of current $I_{k,out}$ at the output of 0.5p. Since the current 460 is split between the two gate contacts $450_1$ and $450_2$, the fractions of current $I_{k,in}$ and $I_{k,out}$ will increase from the first resistive elements $471_6$ and $471_7$, which are the center two first resistive elements, outwards to the first resistive elements $471_1$ and $471_{12}$, which are the two first resistive elements closest to the gate contacts $450_1$ and $450_2$, respectively, as current from the opposing sidewalls and top surface of more semiconductor fins travels from the center dividing point 465 towards the gate contacts $450_1$ and $450_2$.

Additionally, the resistance value of each first resistive element aligned above a semiconductor fin (e.g., see first resistive elements $471_2$, $471_5$, $471_8$, and $471_{11}$) will be the same resistance value $r^{(w)}$ (i.e., a resistance value associated with a segment of the gate structure having a length equal to the width of a semiconductor fin) and the resistance value of all other first resistive elements (e.g., see first resistive elements $471_k$, $471_{3-4}$, $471_{6-7}$, $471_{9-10}$, and $471_{12}$) will be the same resistance value $r^{(s)}/2$ (i.e., a resistance value associated with a segment of the gate structure having a length equal to half the width of the space between two fins). The resistance value of each second resistive element positioned laterally between two fins (e.g., see second resistive elements $472_2$, $472_3$, and $472_4$) will be $r^{(v)}$ (i.e., a resistance value associated with a vertical segment of the gate structure having a length equal to the height of the fins and a width equal to the width space between two fins) and the resistance value of each of the two outer second resistive elements (e.g., see second resistive elements $472_1$ and $472_5$) will $2r^{(v)}$ (i.e., a resistance value associated with a vertical segment of the gate structure having a length equal to the height of the fins and a width equal to the half the width of the space between two fins). Finally, the resistance value of the two gate contacts (e.g., see third resistive elements $473_1$ and $473_2$) will typically be the same resistance value $r^{(e)}$.

Consequently, the total gate resistance $R_g$ can be calculated in this case at process 110 using the same equations (5)-(6) discussed above.

Figure 5A:
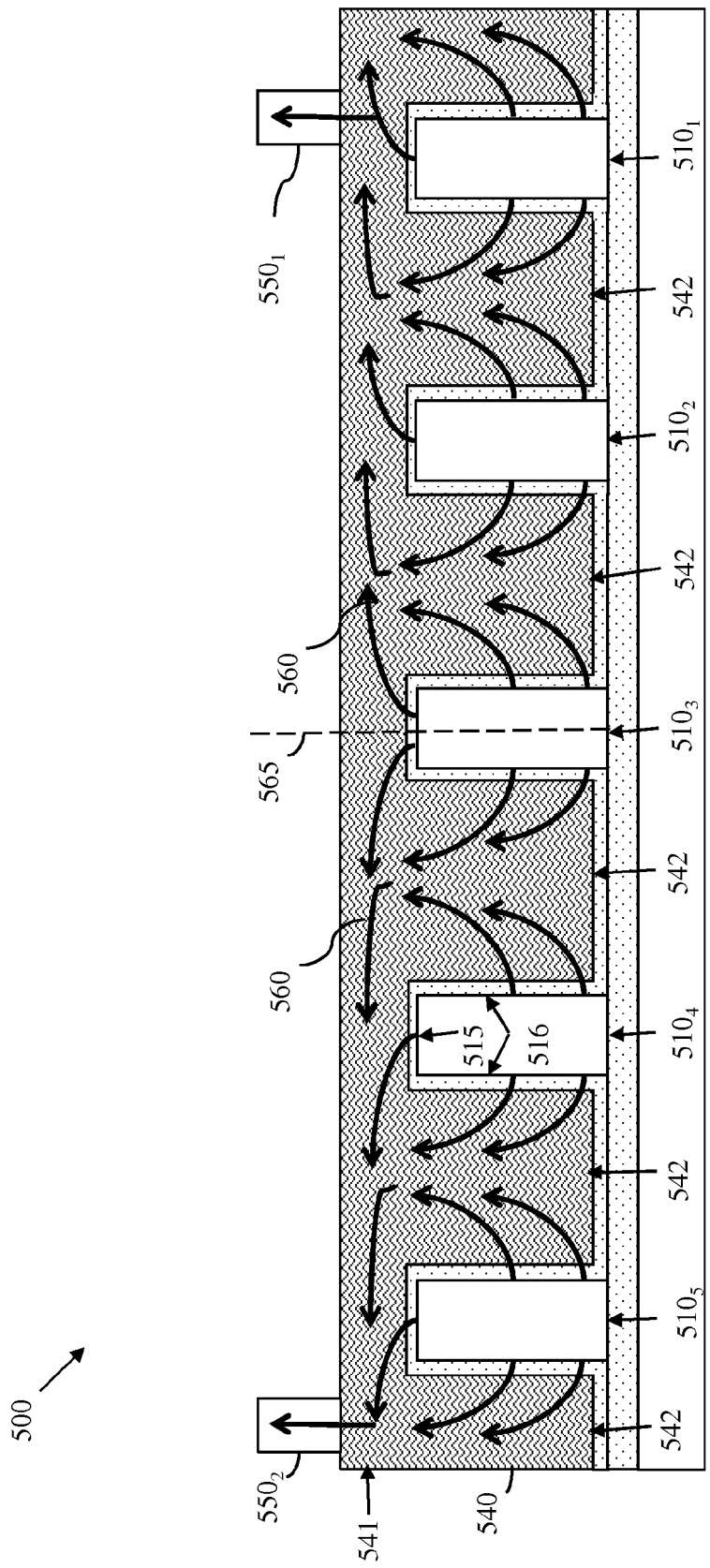
FIG. 5A is a cross-section diagram illustrating yet another exemplary multi-fin MUGFET design that can be stored and accessed according to the method of FIG. 1.

FIG. 5A is shows another exemplary multi-fin MUGFET 500 design that can be accessed at process 104. This multi-fin MUGFET 500 can be configured in essentially the same manner as described in detail above with regard to the multi-fin MUGFET 200 design of FIG. 2. That is, it can comprise a gate structure 540 that traverses the center portions (i.e., the channel regions) of the multiple semiconductor fins $510_1$-$510_5$ such that it has a horizontal portion 541 positioned adjacent to the top surface 515 of each semiconductor fin and vertical portions 542 positioned adjacent to the opposing sidewalls 516 of each semiconductor fin. However, in this case, the multi-fin MUGFET 500 has five semiconductor fins $510_1$-$510_5$ and, particularly, an odd number of semiconductor fins and the gate structure 540 is contacted at opposing ends by two gate contacts $550_1$ and $550_2$. As illustrated, when a multi-fin MUGFET is configured in this manner, gate current 560 will flow from the opposing sidewalls 516 (and, in the case of a tri-gate FET, from the top surface 515) of each of the semiconductor fins $510_1$-$510_5$ into the gate structure 540. However, since the gate structure 540 is contacted by two contacts on the opposing ends of the gate structure, current from the semiconductor fins $510_1$-$510_2$ to the right of a central current dividing point 565 will turn right towards the gate contact $550_1$, current from the semiconductor fins $510_4$-$510_5$ to the left of the central current dividing point 565 will turn left towards the other gate contact $550_2$ and current from the central semiconductor fin $510_3$ through which the central dividing point 565 is drawn is divided between the two gate contacts $550_1$ and $510_2$.

Figure 5B:
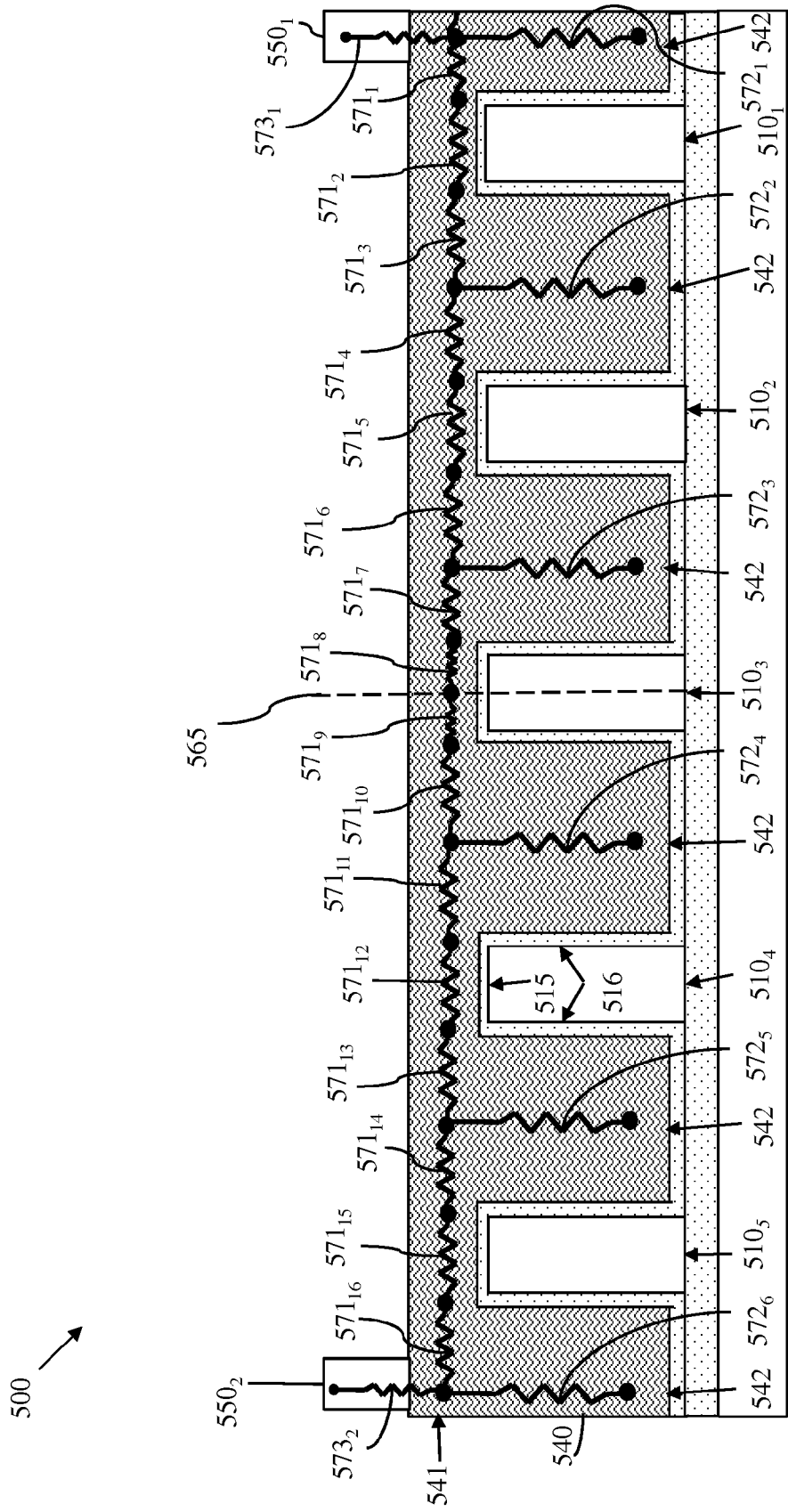
FIG. 5B is an illustration of a resistive network that can be constructed for the multi-fin MUGFET of FIG. 5A according to the method of FIG. 1.

FIG. 5B shows an exemplary resistive network that can be constructed at process 106 for such a multi-fin MUGFET 500 design. Since the number of gate contacts is two (i.e., since gate contacts $550_1$ and $550_2$ are positioned at opposing ends of the horizontal portion 541 of the gate structure 540), two third resistive elements $573_1$ and $573_2$ can be defined at the ends of the gate structure 540. Additionally, since the number of semiconductor fins $510_1$-$510_5$ is five, six second resistive elements $572_1$-$572_6$ can be defined such that each semiconductor fin is positioned laterally between two second resistive elements. That is, the number of second resistive elements will be equal to the number of semiconductor fins ($N_{fin}$) plus one. Since the number of gate contacts is two there is a central current dividing point 565 and since the number of semiconductor fins is an odd number (in this case five), this central current dividing point 565 will fall on a single central semiconductor fin (see fin $510_3$) as opposed to between two adjacent semiconductor fins. Thus, the first resistive elements should be defined slightly differently than the manner discussed above with regard to the exemplary resistive networks of FIGS. 3B and 4B.

That is, the first resistive elements should be defined such that, above the center semiconductor fin $510_3$ there is a pair of resistive elements (e.g., see the first resistive elements $571_9$ and $571_8$) aligned with different halves of the top surface 515 of the center semiconductor fin $510_3$, as defined by the central current dividing point 565. Additionally, above the center semiconductor fin $510_3$, there should be two other resistive elements (e.g., see the first resistive elements $571_{10}$ and $571_7$) that extend laterally beyond opposing sidewalls of said center semiconductor fin. Thus, the length of each of the two resistive elements on the top surface of the center semiconductor fin will be half the width the semiconductor fin and the length of the other two resistive elements will be equal to half the width of the space between two adjacent fins. The remaining first resistive elements can be defined in essentially the same manner as the first resistive elements in FIGS. 3B and 4B above. That is, above each outer semiconductor fin (i.e., above all semiconductor fins $510_{1-2}$ and $510_{4-5}$ other than the center semiconductor fin $510_3$) there can be one resistive element aligned with the top surface of the semiconductor fin and two other resistive elements that extend laterally beyond opposing sidewalls of said outer semiconductor fin.

As mentioned above, the semiconductor fins of a multi-fin dual-gate MUGFET are capped with a dielectric cap (not shown in FIG. 5A). Thus, for a multi-fin dual-gate MUGFET, q will always be equal to zero and, for any of the first resistive elements that are aligned with a top surface of a semiconductor fin capped with a dielectric cap, the difference between the first fraction $I_{k,in}$ and the second fraction $I_{k,out}$ will also be equal to zero.

Additionally, since the number of semiconductor fins ($N_{fin}$) in the exemplary multi-fin MUGFET 500 design of FIG. 5A is five, the total number of first resistive elements will be sixteen (i.e., see first resistive elements $571_1$-$571_{16}$) and these sixteen first resistive elements will be configured as follows: two relatively short first resistive elements $571_8$ and $571_9$ will be aligned with opposite halves of the top surface 515 of the semiconductor fin $510_3$ and the first resistive elements $571_{10}$ and $571_7$ will extend laterally beyond the opposing sidewalls 516 of semiconductor fin $510_3$; and, for the remaining semiconductor fins, a first resistive element $571_2$ will be aligned with the top surface 515 of semiconductor fin $510_1$ and the first resistive elements $571_1$ and $571_3$ will extend laterally beyond the opposing sidewalls of semiconductor fin $510_1$; and so on.

Once the resistive network, as shown in FIG. 5B, is constructed at process 106, the resistive contribution of each of the resistive elements (i.e., each of the first resistive elements $571_1$-$571_{16}$, each of the second resistive elements $572_1$-$572_5$, and the third resistive elements $573_1$ and $573_2$) can be determined (108). As mentioned above, each resistance contribution of each resistive element k can be based on the following: a resistance value $r_k$ of that resistive element k; a first fraction of current from the semiconductor fins entering the resistive element ($I_{k,in}$); and a second fraction of the current from the semiconductor fins exiting the resistive element ($I_{k,out}$). More specifically, each resistance contribution of each resistive element k can be calculated as follows: resistance value $r_k$ of that resistive element k times a function of both the first fraction of current from the semiconductor fins entering the resistive element k ($I_{k,in}$) and the second fraction of the current from the semiconductor fins exiting the resistive element k ($I_{k,out}$). That is, each resistance contribution can be calculated as: $A(I_{k,in}, I_{k,out})r_k$.

Table of FIG. 5C is provided to show, for each of the resistive elements $571_1$-$571_{16}$, $572_1$-$572_6$, and $573_1$-$573_2$, the corresponding resistance value $r_k$, first fraction of current 560 from the semiconductor fins $510_1$-$510_5$ entering the resistive element ($I_{k,out}$), and second fraction of the current from the semiconductor fins exiting the resistive element ($I_{k,out}$). Again, it should be noted that, given the resistive network defined at process 108, values for $r_k$, $I_{k,in}$, and $I_{k,out}$ for some resistive elements are equal to or proportional to the same values for other resistive elements.

Specifically, the semiconductor fins $514_{1-5}$ of the multi-fin MUGFET 500 are essentially identical and the two halves of the gate structure 540, as defined by the central current dividing point 565 are essentially symmetrical, the same amounts of gate current will flow into each of the gate contacts $550_1$ and $550_2$. That is, the amount of gate current entering the gate structure 540 from each fin ($I_{g,1fin}$) will be the same, the sum thereof will be equal to the total amount of gate current ($I_{g,total}$), and half of this amount will exit the gate structure 540 at the gate contact $550_1$ and the other half of this amount will exit the gate structure at gate contact $550_1$.

Furthermore, for each semiconductor fin, $I_{g,1fin}$ is equal to the sum of an amount of gate current (p) exiting the opposing sidewalls 516 (such that p/2 is the amount of gate current exiting a single one of the sidewalls 516) and an amount of gate current (q) exiting the top surface 515. As mentioned above, the semiconductor fins of a multi-fin dual-gate MUGFET are capped with a dielectric cap (not shown in FIG. 5A). Thus, for a multi-fin dual-gate MUGFET, q will always be equal to zero. Consequently, the first fraction of current at the input of each of the second resistive elements $572_{1-6}$ will be zero. The second resistive elements $572_{2-5}$, which are positioned laterally between two fins and which thereby receive current from the sidewalls of the two fins, will have a second fraction of current $I_{k,out}$ at the output of p. However, the second resistive elements $572_1$ and $572_6$, which are on the outside of the gate structure, will have a second fraction of current $I_{kput}$ at the output of 0.5p. Since the current 560 is split between the two gate contact $550_1$ and $550_2$, the fractions of current $I_{k,in}$ and $I_{kput}$ will increase from the first resistive elements $571_8$ and $571_9$, which are the center two first resistive elements, outwards to the first resistive elements $571_1$ and $571_{16}$, which are the two first resistive elements closest to the gate contacts $550_1$ and $550_2$, respectively, as current from the opposing sidewalls and top surface of more semiconductor fins travels from the center dividing point 565 towards the gate contacts $550_1$ and $550_2$.

Additionally, the resistance value of each first resistive element aligned above the outer semiconductor fins (e.g., see first resistive elements $571_2$, $571_5$, $571_{12}$, and $571_{15}$) will be the same resistance value $r^{(w)}$ (i.e., a resistance value associated with a segment of the gate structure having a length equal to the width of a semiconductor fin), the resistance value of each first resistive element aligned above the center semiconductor fin (e.g., see first resistive elements $571_7$ and $571_8$) will be half of the resistance value $r^{(w)}$ (i.e., $r^{(w)}/2$) and the resistance value of all other first resistive elements (e.g., see first resistive elements $571_1$, $571_{3-4}$, $571_{6-7}$, $571_{10-11}$, $571_{13-14}$, and $571_{16}$) will be the same resistance value $r^{(s)}/2$ (i.e., a resistance value associated with a segment of the gate structure having a length equal to half the width of the space between two fins). The resistance value of each second resistive element positioned laterally between two fins (e.g., see second resistive elements $572_2$, $572_3$, $572_4$, and $572_5$) will be $r^{(v)}$ (i.e., a resistance value associated with a vertical segment of the gate structure having a length equal to the height of the fins and a width equal to the width space between two fins) and the resistance value of each of the two outer second resistive elements (e.g., see second resistive elements $572_1$ and $572_6$) will $2r^{(v)}$ (i.e., a resistance value associated with a vertical segment of the gate structure having a length equal to the height of the fins and a width equal to the half the width of the space between two fins). Finally, the resistance value of the two gate contacts (e.g., see third resistive elements $573_1$ and $573_2$) will typically be the same resistance value $r^{(e)}$.

The total gate resistance $R_g$ can be solved in this case at process 110 using the equation (1) above. However, due to the combination of two gate contacts and the odd number of semiconductor fins, simplification of this equation is different than as shown in equations (4)-(6). Specifically, in this case, the master equation (1) for total gate resistance $R_g$ becomes:

$$R_v = \left(\frac{p/2}{N_{fin}I_{g,1fin}}\right)^2 2r^{(v)} + (N_{fin}-1)\left(\frac{p}{N_{fin}I_{g,1fin}}\right)^2 r^{(v)} + \left(\frac{p/2}{N_{fin}I_{g,1fin}}\right)^2 2r^{(v)} + \qquad (7)$$

$$2\left\{\frac{1}{3}d_0^2 \frac{r^{(w)}}{2} + d_0^2 \frac{r^{(s)}}{2} + \sum_{m=1}^{M}\left[c_m^2 \frac{r^{(s)}}{2} + A(c_m, d_m)r^{(w)} + d_m^2 \frac{r^{(s)}}{2}\right]\right\} +$$

$$N_{gcon}\left(\frac{1}{N_{gcon}}\right)^2 r^{(e)},$$

where, as mentioned above, $N_{fin}$ is the total number of semiconductor fins, $N_{gcon}$ is the total number of gate contacts, $r^{(v)}$ is a resistance value associated with a vertical segment of the gate structure having a length equal to the height of the fins and a width equal to the width space between two fins, $r^{(w)}$ is the resistance value associated with a segment of the gate structure having a length equal to the width of a semiconductor fin, $r^{(s)}$ is the resistance value associated with a segment of the gate structure having a length equal to the width of the space between two fins, $r^{(e)}$ is the resistance value associated with a gate contact, p is an amount of gate current entering the gate structure from the opposing sides of a semiconductor fin, q is an amount of gate current entering the gate structure from the top surface of a semiconductor fin, (p+q) is equal to the total amount of current flowing into the gate structure from a single fin $I_{g,1fin}$, and where $$N_{fin} = 2M + 1, \qquad (8)$$

where $c_m = \dfrac{mp + \left(m - \dfrac{1}{2}\right)q}{N_{fin}I_{g,1fin}}$, $m = 1, 2, \ldots, M$, and where $d_m = \dfrac{mp + \left(m + \dfrac{1}{2}\right)q}{N_{fin}I_{g,1fin}}$, $m = 0, 1, 2, \ldots, M$.

Long expression (7) can be simplified as follows:

$$R_g = \frac{N_{fin}r^{(h)}}{3N_{gcon}^2} + \frac{1}{N_{fin}}\left(r^{(v)}\tilde{p}^2 - \frac{1-\tilde{q}^2}{12}r^{(h)} + \frac{\tilde{q}^2 r^{(s)}}{6}\right) + \frac{r^{(e)}}{N_{gcon}}. \qquad (9)$$

It should be noted that equation (9) is the same expression as the simplified equation (5) above. Thus, in any multi-fin MUGFET design, such as those discussed above and illustrated in FIGS. 3A, 4A and 5A, which have either an even number or an odd number of semiconductor fins and which have either one gate contact or a pair of gate contacts on opposite, this simplified equation (9) can be applied to determine the total gate resistance $R_g$ of the multi-fin MUGFET. This total gate resistance $R_g$ can in turn be used to model the multi-fin MUGFET performance. For a double-gate MUGFET (q=0 and thus $\tilde{p}$=1), both equations (5) and (9) are further simplified as follows:

$$R_g = \frac{N_{fin}r^{(h)}}{3N_{gcon}^2} + \frac{1}{N_{fin}}\left(r^{(v)} - \frac{1}{12}r^{(h)}\right) + \frac{r^{(e)}}{N_{gcon}}. \qquad (10)$$

Also disclosed herein are embodiments of a computer system for accurately modeling the total gate resistance of a multi-fin multi-gate field effect transistor (i.e., a multi-fin MUGFET). The computer system can be implemented, for example, in a computer hardware environment such as that described in detail below and depicted in FIG. 6. Specifically, the computer system can comprise at least a memory that stores the above-described design for a multi-fin MUGFET and one or more processor(s) that access the design and perform the above-described steps for modeling the total gate resistance of the multi-fin MUGFET). Also disclosed herein are embodiments of a non-transitory program storage device. This program storage device can be readable by a computer and can tangibly embody a program of instructions that is executable by the computer to perform the above-described method for accurately modeling the total gate resistance of a multi-fin MUGFET.

More particularly, as will be appreciated by one skilled in the art, aspects of the present invention may be embodied as a method, a system or computer program product (e.g., a program storage device). Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable storage medium or a computer readable signal medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments disclosed herein are described below with reference to flowchart illustrations and/or block diagrams of methods, apparatus (systems) and computer program products according to embodiments of the invention. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
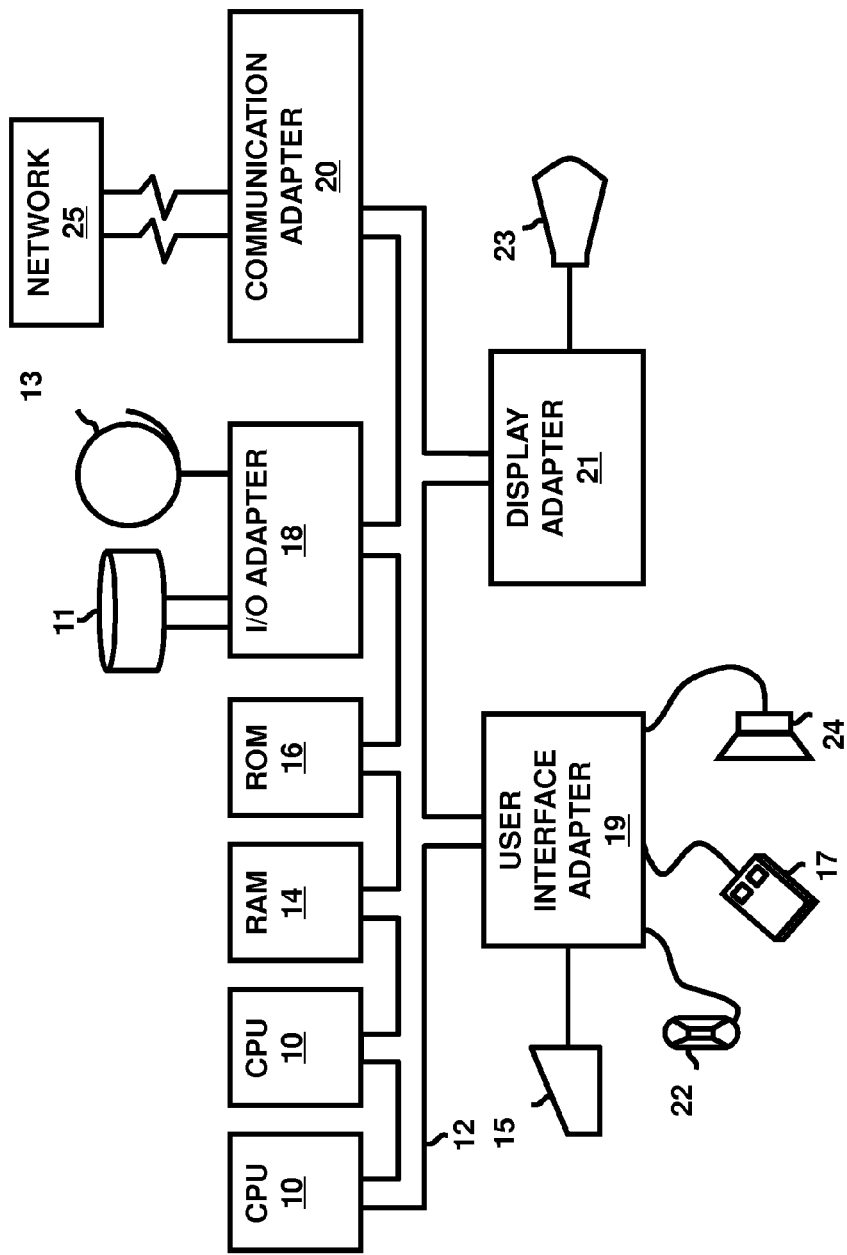
FIG. 6 is a schematic diagram illustrating an exemplary hardware environment that can be used to implement the method, system and program storage device embodiments disclosed herein.

A representative hardware environment for practicing the method, system and program storage device embodiments of the invention is depicted in FIG. 6. This schematic drawing illustrates a hardware configuration of an information handling/computer system in accordance with the embodiments disclosed herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should further be understood that the terminology used herein is for the purpose of describing particular embodiments only and is not intended to be limiting of the invention. As used herein, the singular forms "a", "an" and "the" are intended to include the plural forms as well, unless the context clearly indicates otherwise. It should further be understood that the terms "comprises" "comprising", "includes" and/or "including", as used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The description of the embodiments disclosed herein has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Therefore, disclosed above are embodiments of a method, system and program storage device for accurately modeling the total gate resistance of a multi-fin multi-gate field effect transistor (i.e., a multi-fin MUGFET). Specifically, in these embodiments, a design for a multi-fin MUGFET comprises a gate structure with a horizontal portion, vertical portions and at least one gate contact. The horizontal portion traverses multiple semiconductor fins and comprises a plurality of first resistive elements connected in series. The vertical portions are adjacent to opposing sides of the semiconductor fins and comprise second resistive elements connected in parallel by the horizontal portion. The gate contact(s) land on the horizontal portion and comprise third resistive element(s). This design is accessed and analyzed to determine the total gate resistance based on resistance contributions from the first resistive elements, the second resistive elements and the third resistive element(s), particularly, where each resistive contribution is based on a resistance value of the resistive element, a first fraction of current from the semiconductor fins entering the resistive element and a second fraction of the current from the semiconductor fins exiting the resistive element.

What is claimed is:

1. A modeling method comprising:
   accessing, by a computer from a memory, a design for a field effect transistor, said field effect transistor comprising:
      a gate structure with a horizontal portion traversing multiple semiconductor fins and with vertical portions adjacent to opposing sides of said semiconductor fins; and
      at least one gate contact to said horizontal portion;
   constructing, by said computer and based on said design, a resistive network to define all resistive elements within said gate structure, said resistive elements comprising:
      first resistive elements connected in series within said horizontal portion;
      second resistive elements within said vertical portions and connected in parallel by said horizontal portion; and
      at least one third resistive element within said at least one gate contact; and
   determining, by said computer and based on said resistive network, a total resistance associated with said gate structure, said total resistance being based on resistance contributions from said first resistive elements, said second resistive elements and said at least one third resistive element, and each resistance contribution of each resistive element being based on a resistance value of said resistive element, a square of a first fraction of current from said semiconductor fins entering said resistive element, a square of a second fraction of said current from said semiconductor fins exiting said resistive element and a production of said first fraction and said second fraction, said first fraction and said fraction depending upon what portion of said current from said semiconductor fins flows through each gate contact and upon a location of said resistive element within said resistive network relative to each gate contact.

2. The modeling method of claim 1, said constructing comprising:
   determining a number of said semiconductor fins and a number of gate contacts;
   defining said first resistive elements based on said number of said semiconductor fins and said number of said gate contacts;
   defining said second resistive elements based on said number of said semiconductor fins; and
   defining said at least one third resistive element based on said number of said gate contacts.

3. The modeling method of claim 2, said number of said gate contacts comprising a single gate contact at one end of said horizontal portion and said first resistive elements being defined such that, above each semiconductor fin, is one resistive element aligned with a top surface of said semiconductor fin and two other resistive elements that extend laterally beyond opposing sidewalls of said semiconductor fin.

4. The modeling method of claim 2, said number of said gate contacts comprising two gate contacts at opposing ends of said horizontal portion, said number of said semiconductor fins comprising an even number of said semiconductor fins and said first resistive elements being defined such that, above each semiconductor fin, is one resistive element aligned with a top surface of said semiconductor fin and two other resistive elements that extend laterally beyond opposing sidewalls of said semiconductor fin.

5. The modeling method of claim 2, said number of said gate contacts comprising two gate contacts at opposing ends of said horizontal portion, said number of said semiconductor fins comprising an odd number of said fins, and said first resistive elements being defined as follows:
   above a center semiconductor fin are a pair of resistive elements aligned with different halves of a top surface of said center semiconductor fin and two other resistive elements that extend laterally beyond opposing sidewalls of said center semiconductor fin, and
   above each outer semiconductor fin are one resistive element aligned with a top surface of said outer semiconductor fin and two other resistive elements that extend laterally beyond opposing sidewalls of said outer semiconductor fin.

6. The modeling method of claim 1, wherein, for any of said first resistive elements that are aligned with a top surface of a semiconductor fin capped with a dielectric cap, a difference between said first fraction and said second fraction equals zero.

7. The modeling method comprising:
   accessing, by a computer from a memory, a design for a field effect transistor, said field effect transistor comprising:
      a gate structure with a horizontal portion traversing multiple semiconductor fins and with vertical portions adjacent to opposing sides of said semiconductor fins; and
      at least one gate contact to said horizontal portion;
   constructing, by said computer and based on said design, a resistive network to define all resistive elements within said gate structure, said resistive elements comprising:
      first resistive elements connected in series within said horizontal portion;
      second resistive elements within said vertical portions and connected in parallel by said horizontal portion; and
      at least one third resistive element within said at least one gate contact; and
   determining, by said computer and based on said design, a total resistance associated with said gate structure, said total resistance being a sum of resistance contributions from said first resistive elements, said second resistive elements and said at least one third resistive element, and each resistance contribution of each resistive element being equal to a resistance value of said resistive element times a function of both a first fraction of current from said semiconductor fins entering said resistive element and a second fraction of said current from said semiconductor fins exiting said resistive element,
   said function being equal to one third ($\frac{1}{3}$) times a sum of the following: (i) the square of said first fraction of current from said semiconductor fins entering said resistive element, (ii) the square of said second fraction of current from said semiconductor fins exiting said resistive element, and (iii) the product of said first fraction of said current from said semiconductor fins entering said resistive element and said second fraction of said current from said semiconductor fins exiting said resistive element.

8. The modeling method of claim 7, said constructing comprising:
    determining a number of said semiconductor fins and a number of gate contacts;
    defining said first resistive elements based on said number of said semiconductor fins and said number of said gate contacts;
    defining said second resistive elements based on said number of said semiconductor fins; and
    defining said at least one third resistive element based on said number of said gate contacts.

9. The modeling method of claim 8, said number of said gate contacts comprising a single gate contact at one end of said horizontal portion and said first resistive elements being defined such that, above each semiconductor fin, is one resistive element aligned with a top surface of said semiconductor fin and two other resistive elements that extend laterally beyond opposing sidewalls of said semiconductor fin.

10. The modeling method of claim 8, said number of said gate contacts comprising two gate contacts at opposing ends of said horizontal portion, said number of said semiconductor fins comprising an even number of said semiconductor fins and said first resistive elements being defined such that, above each semiconductor fin, is one resistive element aligned with a top surface of said semiconductor fin and two other resistive elements that extend laterally beyond opposing sidewalls of said semiconductor fin.

11. The modeling method of claim 8, said number of said gate contacts comprising two gate contacts at opposing ends of said horizontal portion, said number of said semiconductor fins comprising an odd number of said fins, and said first resistive elements being defined as follows:
    above a center semiconductor fin are a pair of resistive elements aligned with different halves of a top surface of said center semiconductor fin and two other resistive elements that extend laterally beyond opposing sidewalls of said center semiconductor fin, and
    above each outer semiconductor fin are one resistive element aligned with a top surface of said outer semiconductor fin and two other resistive elements that extend laterally beyond opposing sidewalls of said outer semiconductor fin.

12. The modeling method of claim 7, wherein, for any of said first resistive elements that are aligned with a top surface of a semiconductor fin capped with a dielectric cap, a difference between said first fraction and said second fraction equals zero.

13. A modeling system comprising:
    a memory storing a design for a field effect transistor, said field effect transistor comprising:
        a gate structure with a horizontal portion traversing multiple semiconductor fins and with vertical portions adjacent to opposing sides of said semiconductor fins; and
        at least one gate contact to said horizontal portion; and
    at least one processor accessing said design and constructing, based on said design, a resistive network to define all resistive elements within said gate structure, said resistive elements comprising:
        first resistive elements connected in series within said horizontal portion;
        second resistive elements within said vertical portions and connected in parallel by said horizontal portion; and
        at least one third resistive element within said at least one gate contact,
    said at least one processor further determining, based on said resistive network, a total resistance associated with said gate structure, said total resistance being based on resistance contributions from said first resistive elements, said second resistive elements and said at least one third resistive element, and each resistance contribution of each resistive element being based on a resistance value of said resistive element, a square of a first fraction of current from said semiconductor fins entering said resistive element, square of a second fraction of said current from said semiconductor fins exiting said resistive element, and a product of said first fraction and said second fraction, said first and said second fraction depending upon what portion of said current from said semiconductor fins flows through each gate contact and upon a location of said resistive element within said resistive network relative to each gate contact.

14. The system of claim 13, said at least one processor further performing the following during said constructing:
    determining a number of said semiconductor fins and a number of gate contacts;
    defining said first resistive elements based on said number of said semiconductor fins and said number of said gate contacts;
    defining said second resistive elements based on said number of said semiconductor fins; and
    defining said at least one third resistive element based on said number of said gate contacts.

15. The system of claim 14, said number of said gate contacts comprising a single gate contact at one end of said horizontal portion and said first resistive elements being defined such that, above each semiconductor fin, is one resistive element aligned with a top surface of said semiconductor fin and two other resistive elements that extend laterally beyond opposing sidewalls of said semiconductor fin.

16. The system of claim 14, said number of said gate contacts comprising two gate contacts at opposing ends of said horizontal portion, said number of said semiconductor fins comprising an even number of said semiconductor fins and said first resistive elements being defined such that, above each semiconductor fin, is one resistive element aligned with a top surface of said semiconductor fin and two other resistive elements that extend laterally beyond opposing sidewalls of said semiconductor fin.

17. The system of claim 14, said number of said gate contacts comprising two gate contacts at opposing ends of said horizontal portion, said number of said semiconductor fins comprising an odd number of said fins, and said first resistive elements being defined as follows:
    above a center semiconductor fin are a pair of resistive elements aligned with different halves of a top surface of said center semiconductor fin and two other resistive elements that extend laterally beyond opposing sidewalls of said center semiconductor fin, and
    above each outer semiconductor fin are one resistive element aligned with a top surface of said outer semiconductor fin and two other resistive elements that extend laterally beyond opposing sidewalls of said outer semiconductor fin.

18. The system of claim 13, wherein, for any of said first resistive elements that are aligned with a top surface of a semiconductor fin capped with a dielectric cap, a difference between said first fraction and said second fraction equals zero.

19. A computer program product comprising a non-transitory computer readable medium having computer readable program code stored thereon, said computer readable program code being executable by said computer to perform a modeling method, said method comprising:
- accessing, from a memory, a design for a field effect transistor, said field effect transistor comprising:
  - a gate structure with a horizontal portion traversing multiple semiconductor fins and with vertical portions adjacent to opposing sides of said semiconductor fins; and
  - at least one gate contact to said horizontal portion;
- constructing, based on said design, a resistive network to define all resistive elements within said gate structure, said resistive elements comprising:
  - first resistive elements connected in series within said horizontal portion;
  - second resistive elements within said vertical portions and connected in parallel by said horizontal portion; and
  - at least one third resistive element within said at least one gate contact; and
- determining, based on said resistive network, a total resistance associated with said gate structure, said total resistance being a sum of resistance contribution from said first resistive elements, said second resistive elements and said at least one third resistive element, and each resistance contribution of each resistive element being equal to a resistance value of said resistive element times a funtion of both a first fraction of current from said semiconductor fins entering said resistive element and a second fraction of said current from said semiconductor fins exiting said resistive element,
- said function being equal to one third (⅓) times a sum of the following: (i) the square of said first fraction of said current from said semiconductor fins entering said resistive element, (ii) the square of said second fraction of said current from said semiconductor fins exiting said resistive element, and (iii) the product of said first fracrion of said current from said semiconductor fins entering said resistive element and said second fraction of said current from said semiconductor fins exiting said resistive element.

20. The computer program product of claim 19, said constructing comprising:
- determining a number of said semiconductor fins and a number of gate contacts;
- defining said first resistive elements based on said number of said semiconductor fins and said number of said gate contacts;
- defining said second resistive elements based on said number of said semiconductor fins; and
- defining said at least one third resistive element based on said number of said gate contacts.

21. The computer program product of claim 20, said number of said gate contacts comprising a single gate contact at one end of said horizontal portion and said first resistive elements being defined such that, above each semiconductor fin, is one resistive element aligned with a top surface of said semiconductor fin and two other resistive elements that extend laterally beyond opposing sidewalls of said semiconductor fin.

22. The computer program product of claim 20, said number of said gate contacts comprising two gate contacts at opposing ends of said horizontal portion, said number of said semiconductor fins comprising an even number of said semiconductor fins and said first resistive elements being defined such that, above each semiconductor fin, is one resistive element aligned with a top surface of said semiconductor fin and two other resistive elements that extend laterally beyond opposing sidewalls of said semiconductor fin.

23. The computer program product of claim 20, said number of said gate contacts comprising two gate contacts at opposing ends of said horizontal portion, said number of said semiconductor fins comprising an odd number of said fins, and said first resistive elements being defined as follows:
- above a center semiconductor fin are a pair of resistive elements aligned with different halves of a top surface of said center semiconductor fin and two other resistive elements that extend laterally beyond opposing sidewalls of said center semiconductor fin, and
- above each outer semiconductor fin are one resistive element aligned with a top surface of said outer semiconductor fin and two other resistive elements that extend laterally beyond opposing sidewalls of said outer semiconductor fin.

24. The computer program product of claim 19, wherein, for any of said first resistive elements that are aligned with a top surface of a semiconductor fin capped with a dielectric cap, a difference between said first fraction and said second fraction equals zero.

* * * * *